(12) United States Patent
Komatsubara et al.

(10) Patent No.: US 11,987,100 B2
(45) Date of Patent: May 21, 2024

(54) FLUID DISCHARGE DEVICE

(71) Applicant: DENSO CORPORATION, Kariya (JP)

(72) Inventors: Yusuke Komatsubara, Kariya (JP); Hitoshi Ninomiya, Kariya (JP); Takahito Nakamura, Kariya (JP); Jun Yamaoka, Kariya (JP); Marie Nagahama, Kariya (JP)

(73) Assignee: DENSO CORPORATION, Kariya (JP)

( * ) Notice: Subject to any disclaimer, the term of this patent is extended or adjusted under 35 U.S.C. 154(b) by 716 days.

(21) Appl. No.: 17/086,981

(22) Filed: Nov. 2, 2020

(65) Prior Publication Data

US 2021/0046803 A1 Feb. 18, 2021

Related U.S. Application Data

(63) Continuation of application No. PCT/JP2019/016668, filed on Apr. 18, 2019.

(30) Foreign Application Priority Data

May 11, 2018 (JP) .................................. 2018-092156
Mar. 15, 2019 (JP) .................................. 2019-048336

(51) Int. Cl.
    *B60H 1/34* (2006.01)
(52) U.S. Cl.
    CPC .......... *B60H 1/3414* (2013.01); *B60H 1/3421* (2013.01)
(58) Field of Classification Search
    CPC ..... B60H 1/3414; B60H 1/3421; B60H 1/345
    USPC .......................................................... 454/155
    See application file for complete search history.

(56) References Cited

U.S. PATENT DOCUMENTS

2008/0200110 A1 8/2008 Ghosh et al.
2019/0118780 A1 4/2019 Motomura

FOREIGN PATENT DOCUMENTS

| DE | 102017106853 B3 | 1/2018 |
| DE | 112017003059 T5 | 2/2019 |
| EP | 2815909 A1 | 12/2014 |
| JP | S60155844 U | 10/1985 |
| JP | H07247167 A | 9/1995 |
| JP | 3432583 B2 | 8/2003 |
| JP | 2010064608 A | * 3/2010 |
| JP | 2019196139 A | 11/2019 |
| JP | 2019200038 A | 11/2019 |

* cited by examiner

*Primary Examiner* — Allen R. B. Schult
*Assistant Examiner* — William C Weinert
(74) *Attorney, Agent, or Firm* — Harness, Dickey & Pierce, P.L.C.

(57) ABSTRACT

A fluid discharge device is for discharging a fluid includes a duct defining a fluid flow passage and having an opening at a downstream end of the fluid flow passage. The fluid discharge device includes a grill portion disposed in the fluid flow passage to adjust a flow direction of the fluid blown from the opening. The grill portion includes at least an adjustment fin rotatably arranged in the fluid flow passage, and is provided with an auxiliary flow passage that guides a part of the fluid flowing through the fluid flow passage to the opening as an auxiliary flow. The auxiliary flow passage is configured together with the adjustment fin to adjust a flow direction of the auxiliary flow discharged from the auxiliary flow passage to be aligned with the flow direction of the fluid flowing through the fluid flow passage.

16 Claims, 22 Drawing Sheets

FLUID DISCHARGE DEVICE

CROSS REFERENCE TO RELATED APPLICATION

The present application is a continuation application of International Patent Application No. PCT/JP2019/016668 filed on Apr. 18, 2019, which designated the U.S. and claims the benefit of priority from Japanese Patent Applications No. 2018-092156 filed on May 11, 2018, and No. 2019-048336 filed on Mar. 15, 2019. The entire disclosures of all of the above applications are incorporated herein by reference.

TECHNICAL FIELD

The present disclosure relates to a fluid discharge device that discharges a fluid.

BACKGROUND

Conventionally, a register for automobiles includes a louver for adjusting left and right wind directions and a barrel made of a plurality of fins, and two side surfaces of the barrel are provided with pins rotatably inserted into pin holes provided in a blower case. In this automobile register, a vertical wind direction can be adjusted by rotating the entire barrel up and down.

SUMMARY

According to an aspect of the present disclosure, a fluid discharge device includes a duct defining a fluid flow passage and having an opening at a downstream end of the fluid flow passage, and a grill portion disposed in the fluid flow passage to adjust a flow direction of the fluid blown from the opening.

The grill portion includes at least an adjustment fin rotatably arranged in the fluid flow passage, and is provided with an auxiliary flow passage that guides a part of the fluid flowing through the fluid flow passage to the opening as an auxiliary flow. The auxiliary flow passage is configured together with the adjustment fin to adjust a flow direction of the auxiliary flow discharged from the auxiliary flow passage to be aligned with the flow direction of the fluid flowing through the fluid flow passage.

According to this, the auxiliary flow passage is provided in the adjustment fin. Therefore, the auxiliary flow discharged from the auxiliary flow passage flows together in parallel with the main flow flowing through the fluid flow passage. In this case, since development of the lateral vortex formed in the main flow can be suppressed by the auxiliary flow, it is possible to suppress a diffusion of the main flow and a suction of an external fluid drawn from the outside of the device into the main flow. When the direction of the fluid blown out from the opening is adjusted by the adjustment fin, the flow direction of the auxiliary flow can be aligned with the flow direction of the fluid flowing through the fluid flow passage. Thus, even if the direction of the fluid discharged from the opening is adjusted, the reaching distance of the discharged fluid can be lengthened.

BRIEF DESCRIPTION OF THE DRAWINGS

The above and other objects, features and advantages of the present disclosure will become more apparent from the following detailed description made with reference to the accompanying drawings.

DESCRIPTION OF EMBODIMENTS

Figure 1:
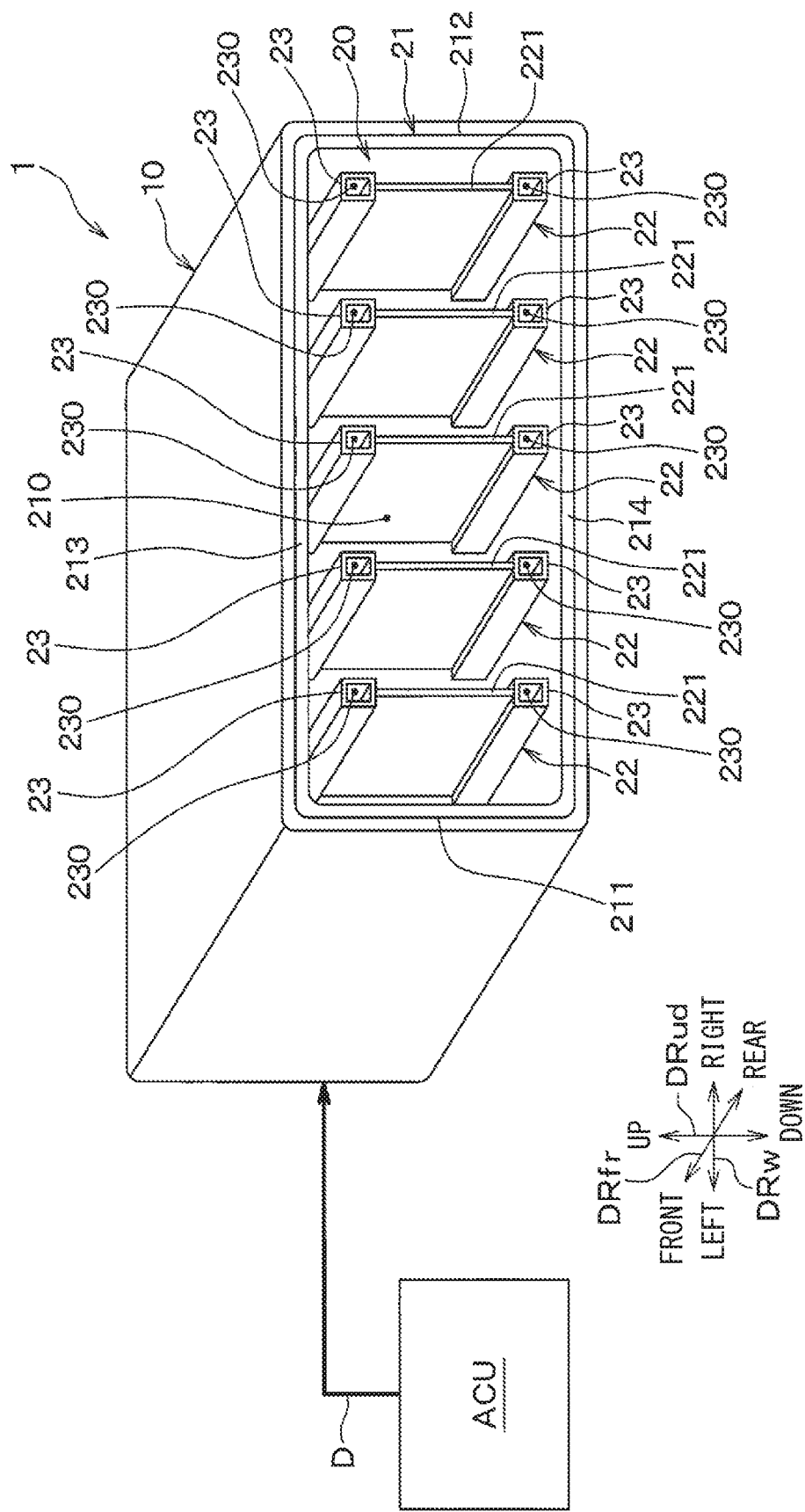
FIG. 1 is a schematic perspective view of a fluid discharge device according to a first embodiment.

In an air discharge device of an automobile register, it may be desirable to increase a reaching distance of an airflow so as to give an air-conditioning feeling not only to the front seat area but also to the rear seat area of a vehicle. However, in the case of having the function of adjusting the direction of the airflow, the reaching distance of the airflow discharged at the time of adjusting the direction of the airflow tends to be short. Such a problem may occur not only in the register for automobiles but also in other fluid discharge devices for discharging a fluid.

An object of the present disclosure is to provide a fluid discharge device capable of increasing a reaching distance of a fluid to be discharged even when adjusting a direction of a fluid flow.

The inventors of the present application have deeply studied to increase the reaching distance of the fluid in a fluid discharge device. According to the inventor's studies, when the fluid is discharged from the fluid discharge device, a lateral vortex is generated due to a velocity gradient of the fluid, and thereby the main flow is diffused by the lateral vortex and an external fluid outside the device is blown from the fluid discharge device by the lateral vortex. In this case, the reaching distance of the fluid tends to be shortened.

The present disclosure has been devised by the inventors based on the above studies.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The respective embodiments described herein may be partially combined with each other as long as no particular problems are caused even without explicit statement of these combinations.

First Embodiment

The present embodiment will be described with reference to FIGS. 1 to 10. In the present embodiment, an example, in which a fluid blowing device 1 of the present disclosure is applied to an air discharge device of an air conditioning unit ACU that air-conditions a vehicle interior, will be described. The air conditioning unit ACU is disposed, for example, inside an instrument panel provided at the foremost portion in a passenger compartment. The air discharge device of the air conditioning unit ACU is installed at the instrument panel or inside of the instrument panel.

The fluid discharge device 1 shown in FIG. 1 is a device configured to discharge the conditioned air with a temperature adjusted by the air conditioning unit ACU, into the vehicle interior. The fluid discharge device 1 is configured to include a duct 10, and a grill portion 20 that adjusts the direction of the air flow blown into the vehicle interior. In the figure, DRud, DRfr, and DRw indicated by arrows respectively show an up-down direction, a front-rear direction, and a left-right direction when the fluid discharge device is mounted on a vehicle.

Figure 2:
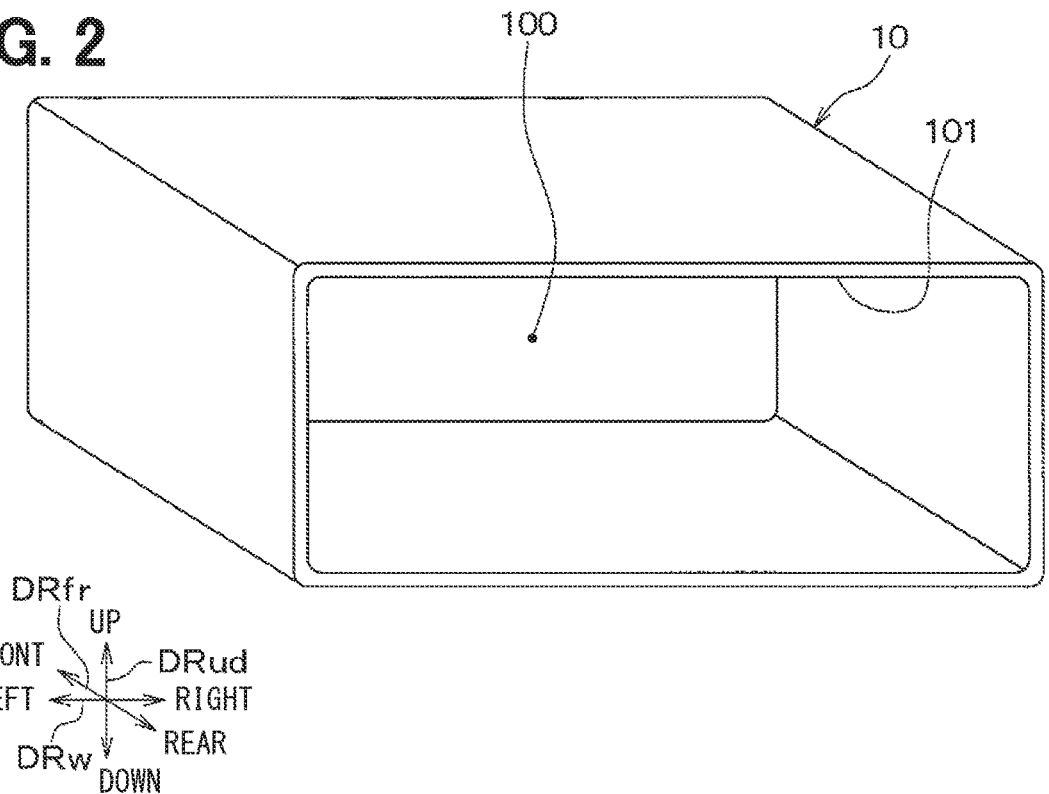
FIG. 2 is a schematic perspective view of a duct of the fluid discharge device according to the first embodiment.

As shown in FIGS. 1 and 2, the duct 10 is formed of a substantially square tubular member, and an air-conditioning flow passage 100 is formed therein. The duct 10 is provided with an opening 101 at a downstream end of the flow passage 100. In the duct 10, the grill portion 20 is housed at a position close to the opening 101 in the flow passage 100 formed inside the duct 10.

The duct 10 is connected to the air conditioning unit ACU via an air conditioning duct D so that the air having an adjusted temperature or humidity is introduced as a fluid into the flow passage 100 inside of the base portion 10. In the present embodiment, the air conditioning unit ACU is an adjusting device that adjusts the temperature or humidity of the air introduced into the duct 10. The opening 101 of the duct 10 has a flat opening shape in which a vertical dimension of the opening 101 is smaller than a horizontal dimension thereof.

Figure 3:
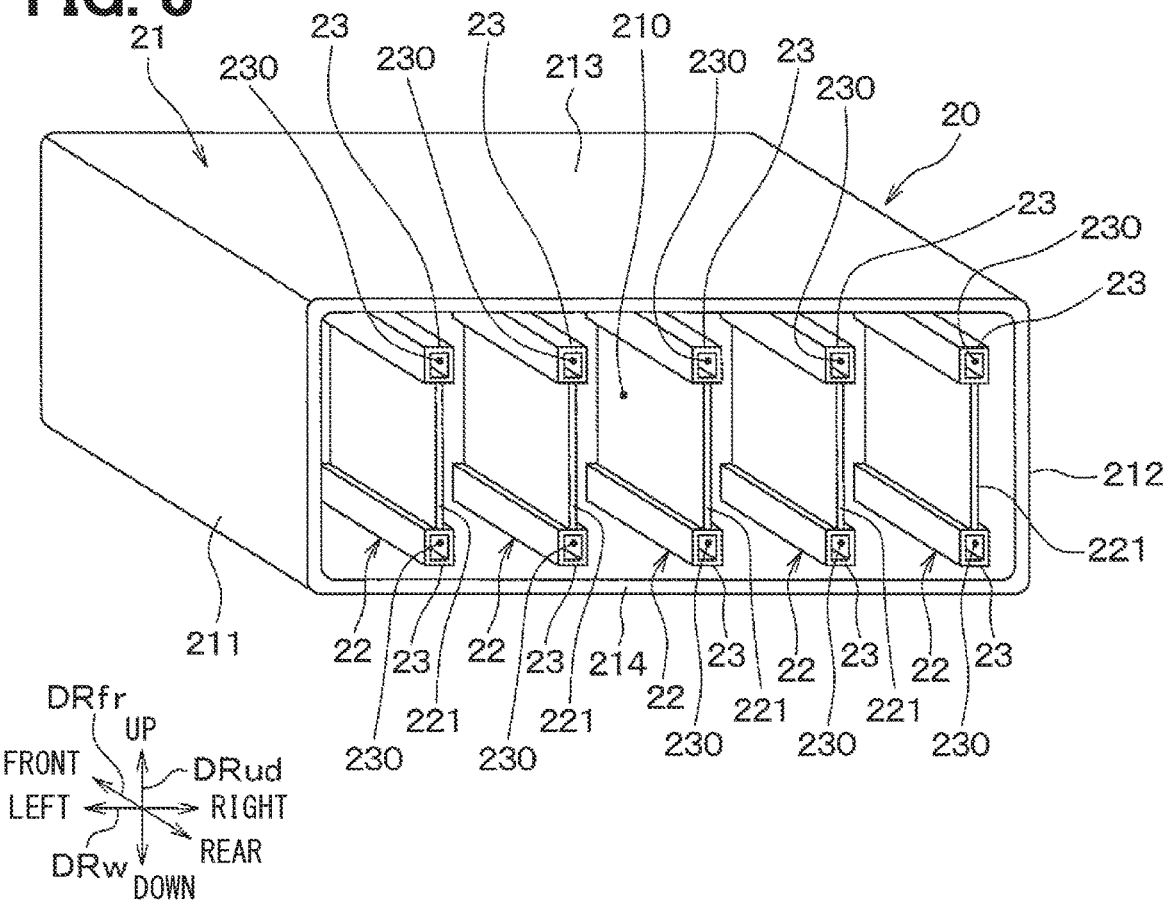
FIG. 3 is a schematic perspective view of a grill portion of the fluid discharge device according to the first embodiment.

The grill portion 20 is accommodated in the flow passage 100 of the duct 10 and adjusts the flow direction of the air blown out of the opening 101 of the duct 10. As shown in FIG. 3, the grill portion 20 includes a main frame body 21, a plurality of adjustment fins 22 extending along the up-down direction DRud inside the main frame body 21, and a sub-frame body 23.

The main frame body 21 defines a main flow passage 210 that guides a part of the air flow flowing through the flow passage 100 into the opening 101 as the main flow. The main frame body 21 is made of a substantially square tubular member that can be accommodated inside the duct 10. In other words, the main frame body 21 has an outer shape that can be fitted inside the duct 10.

Specifically, the main frame body 21 includes a left frame 211 and a right frame 212 extending along the up-down direction DRud, and an upper frame 213 and a lower frame 214 positioned at two ends of the left frame 211 and the right frame 212. The upper frame 213 and the lower frame 214 are connected to both of the left frame 211 and the right frame 212. The upper frame 213 and the lower frame 214 have an equal dimension that is longer than a dimension of the left frame 211 and the right frame 212 so that a rectangular flow passage is formed inside the main frame body 21.

The left frame 211 and the right frame 212 extend along a longitudinal direction (i.e., the up-down direction DRud in this example) of the adjustment fin 22. In the present embodiment, the left frame 211 and the right frame 212 form a pair of vertical frames extending along the longitudinal direction of the adjustment fin 22.

The upper frame 213 and the lower frame 214 are located at two end sides of the adjustment fin 22 in the longitudinal direction, and extend along a thickness direction of the adjustment fin 22 (in this embodiment, the left-right direction DRw). In the present embodiment, the upper frame 213 and the lower frame 214 form a pair of horizontal frames connected to both the left frame 211 and the right frame 212 at the two ends in the longitudinal direction of the adjustment fin 22.

Figure 4:
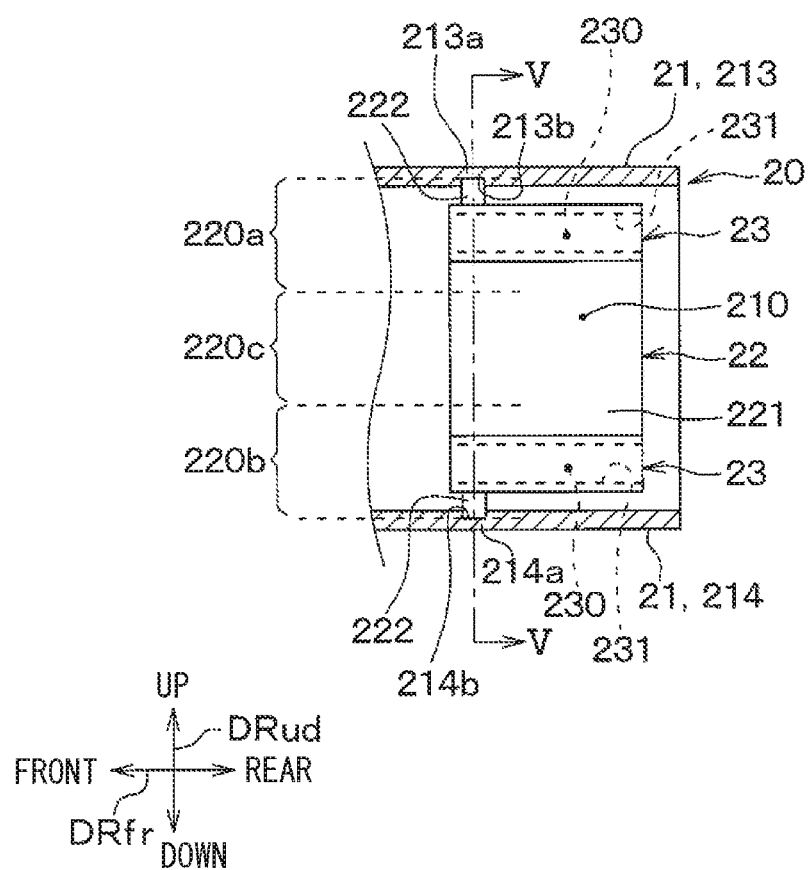
FIG. 4 is a schematic cross-sectional view of the grill portion of the fluid discharge device according to the first embodiment.
Figure 5:
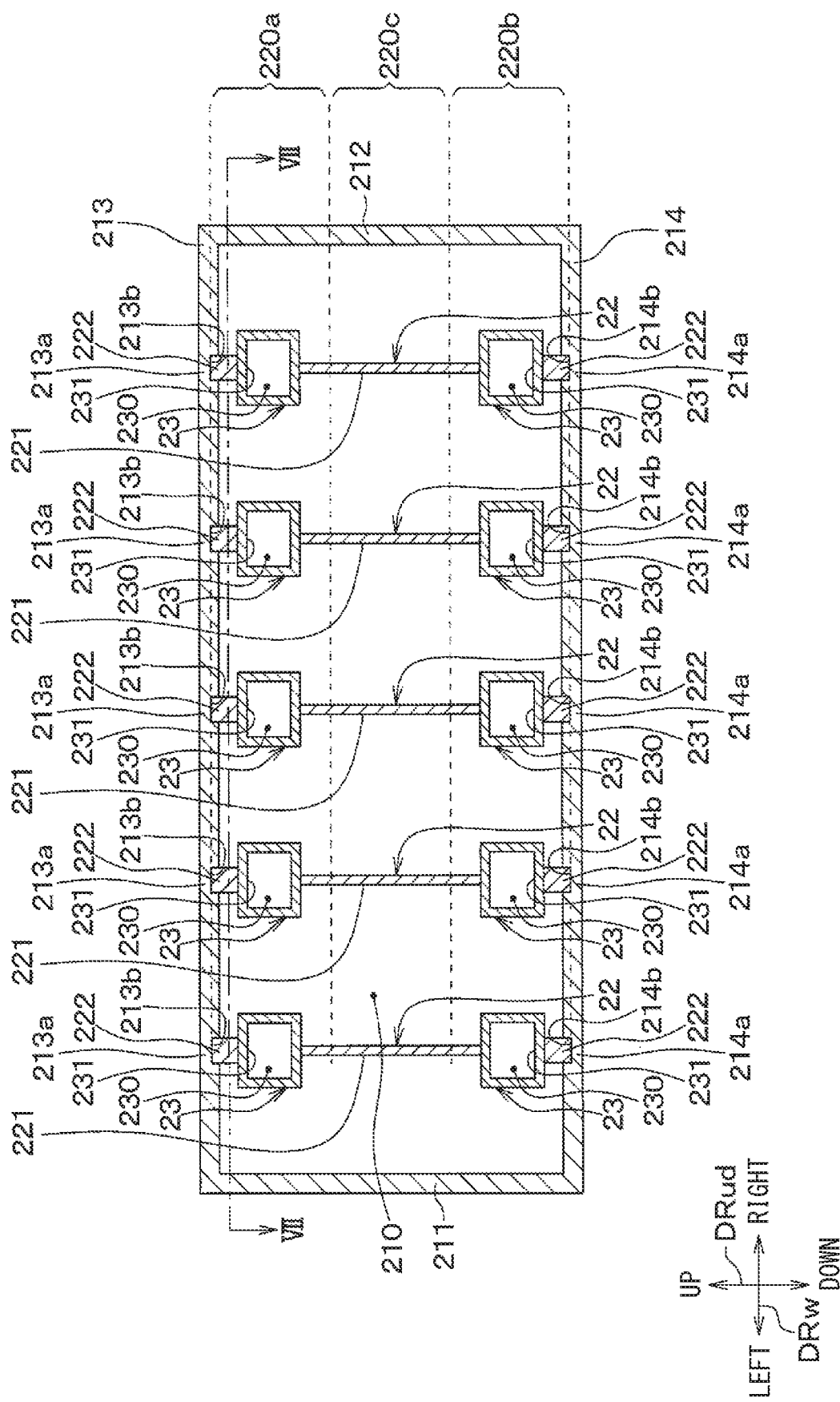
FIG. 5 is a cross-sectional view taken along line V-V of FIG. 4.

As shown in FIGS. 4 and 5, the upper frame 213 and the lower frame 214 include wall portions 213a, 214a facing to the ends of the adjustment fins 22 in the longitudinal direction of the adjustment fins 22, and the wall portions 213a, 214a are provided with fitting grooves 213b, 214b into which rotation pins 222 of the adjustment fins 22 described later are fitted.

The plurality of adjustment fins 22 are configured as a flow direction adjusting member for adjusting the flow direction of the airflow blown from the opening 101. For example, five adjustment fins 22 are arranged in the grill portion 20. The number of adjustment fins 22 arranged in the grill portion 20 is not limited to 5, and may be less than 5 or may be equal to or more than 6. That is, at least one adjustment fin 22 may be arranged in the grill portion 20.

The plurality of adjustment fins 22 are rotatably arranged in the flow passage 100. The plurality of adjustment fins 22 of the present embodiment have longitudinal ends rotatably supported to the upper frame 213 and the lower frame 214 of the main frame body 21 so that the direction of the airflow can be adjusted in the left-right direction DRw.

In the present embodiment, the portion of the adjustment fin 22 located closer to the upper frame 213 than a central portion in the longitudinal direction of the adjustment fin 22 is designated as a first outside portion 220a, and the portion of the adjustment fin 22 located closer to the lower frame 214 than the central portion in the longitudinal direction of the adjustment fin 22 is designated as a second outside portion 220b. Further, in the present embodiment, the portion of the adjustment fin 22 located closer to the central portion in the longitudinal direction than the main frame body 21 is referred to as an inside portion 220c, as shown in FIG. 5.

Figure 6:
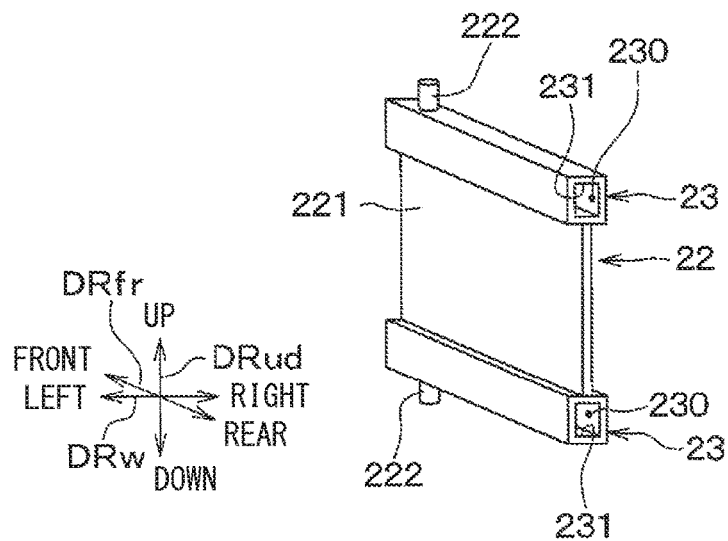
FIG. 6 is a schematic perspective view of an adjustment fin of the fluid discharge device according to the first embodiment.

As shown in FIG. 6, the adjustment fin 22 includes a plate portion 221 extending along the up-down direction DRud, and rotation pins 222 provided at two ends in the longitudinal direction of the plate portion 221. The rotation pin 222 has a size capable of being fitted into the fitting grooves 213b and 214b of the main frame body 21.

Figure 7:
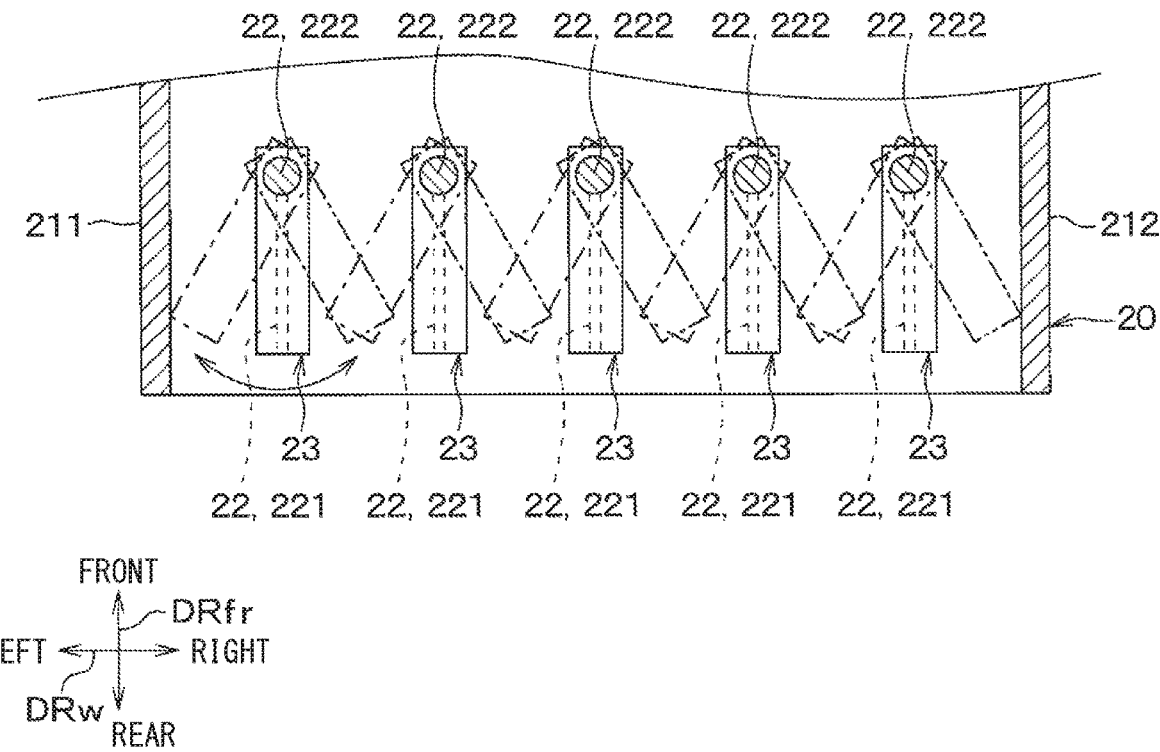
FIG. 7 is a cross-sectional view taken along VII-VII line of FIG. 5.

The rotation pins 222 are respectively fitted into the fitting grooves 213b, 214b of the main frame body 21, so that the adjustment fin 22 is rotatable about the rotation pin 222 as shown in FIG. 7. Although not shown, the rotation pins 222 of the plurality of adjustment fins 22 are connected by a connection member so as to be rotatable in conjunction with each other. An actuator (not shown) is connected to the connection member, so that the plurality of adjustment fins 22 are driven by this actuator.

The sub-frame body 23 defines an auxiliary flow passage 230 that guides the remaining airflow except for the airflow flowing through the main flow passage 210 to the opening 101 as an auxiliary flow, among the airflow flowing through the flow passage 100.

As shown in FIGS. 5 and 6, the sub-frame body 23 is integrally provided with the adjustment fin 22 so that the direction of the auxiliary flow blown out from the auxiliary flow passage 230 is aligned with the direction of the main flow blown out from the main flow passage 210. That is, the sub-frame body 23 is configured so that the direction of the auxiliary flow (side stream) blown out from the auxiliary flow passage 230 changes in synchronization with the direction of the main flow (mainstream) blown out from the main flow passage 210.

The sub-frame body 23 is formed in a tubular shape. The auxiliary flow passage 230 is formed by an inner wall portion 231 of the sub-frame body 23. The sub-frame body 23 of the present embodiment is configured so that the cross-sectional area of the auxiliary flow passage 230 is substantially constant.

The sub-frame body 23 is provided at the adjustment fin 22 so that a part of the main flow passage 210 and the auxiliary flow passage 230 overlap each other in the circumferential direction of the main frame body 21. That is, the adjustment fins 22 adjacent to each other are arranged with respect to the main frame body 21 so that a part of the main flow passage 210 is formed between the sub-frame bodies 23.

The sub-frame bodies 23 are respectively arranged with respect to the first outside portion 220a and the second outside portion 220b of the adjustment fin 22 so as to be aligned in an outer region of the main flow passage 210 near the main frame body 21 in the circumferential direction of the main frame body 21. More specifically, the sub-frame bodies 23 are provided at both ends in the longitudinal direction of the plate portion 221 constituting the adjustment fin 22. As a result, the auxiliary flow passage 230 is positioned between the adjustment fins 22 and the inner wall surface of the duct 10. Then, the auxiliary stream flows substantially in parallel with the main stream flowing along the inner wall surface of the duct 10.

Figure 8:
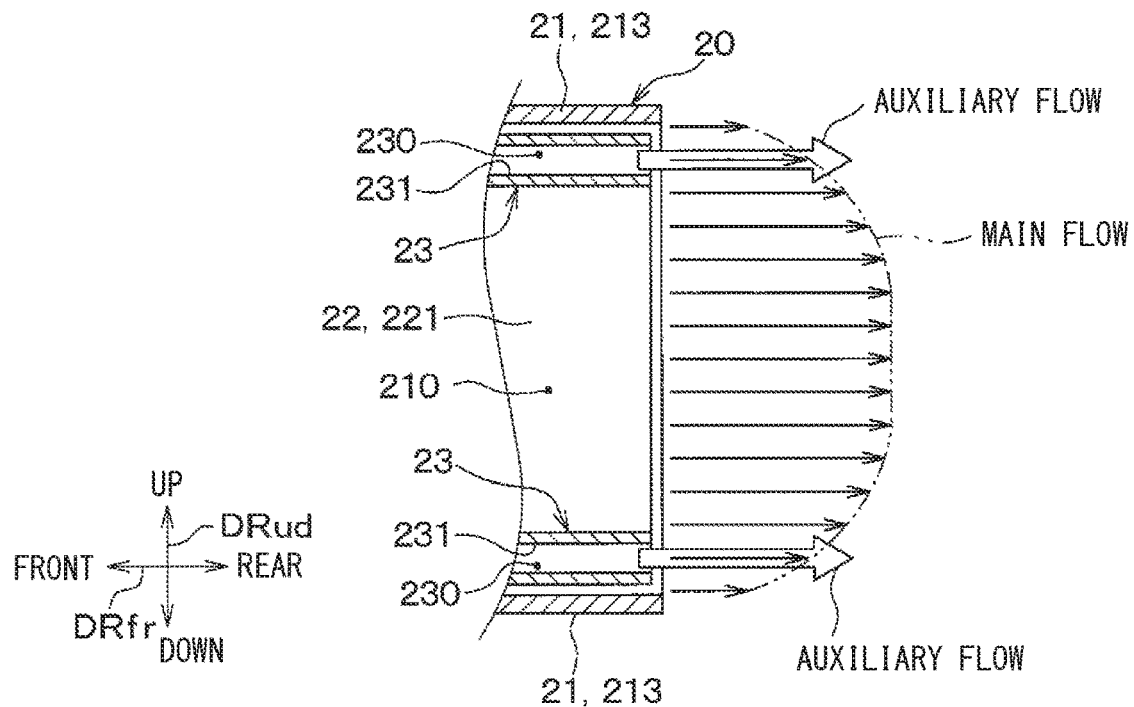
FIG. 8 is a diagram for explaining a relationship between a main flow and an auxiliary flow blown from the grill portion of the fluid discharge device according to the first embodiment.

Next, operation of the fluid discharge device 1 will be described with reference to FIGS. 8 to 10. When the air conditioning unit ACU operates, the conditioned air with a temperature or humidity adjusted by the air conditioning unit ACU, flows into the fluid discharge device 1 through an air conditioning duct. The conditioned air flowing into the fluid discharge device 1 flows through the flow passage 100 of the duct 10, and then a part of the conditioned air flows into the main flow passage 210 and the rest part flows into the auxiliary flow passage 230. As shown in FIG. 8, the conditioned air flowing through the main flow passage 210 and the auxiliary flow passage 230 is blown into the vehicle interior.

Figure 9:
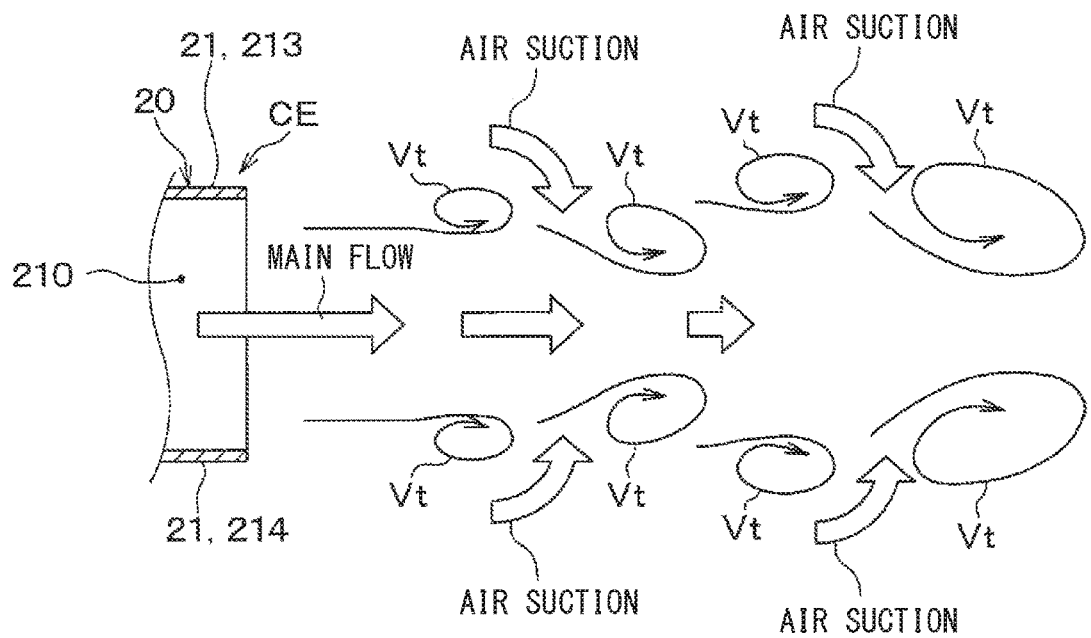
FIG. 9 is a diagram for explaining a state of the airflow blown from a grill portion of a fluid discharge device of a comparative example comparative with the first embodiment.

FIG. 9 is a diagram for explaining a state of the airflow blown from a fluid discharge device CE of a comparative example, comparative with the first embodiment. The fluid discharge device CE as the comparative example is different from the fluid discharge device 1 of the present embodiment, in that the auxiliary flow passage 230 is not provided in the grill portion 20. In order to facilitate understanding of the description, in the fluid discharge device CE of the comparative example shown in FIG. 9, the same reference numerals as the fluid discharge device 1 of the first embodiment are used for members having the same functions as those of the fluid discharge device 1 of the present embodiment.

As shown in FIG. 9, in the fluid discharge device CE of the comparative example, when the main flow is blown from the main flow passage 210, innumerable lateral vortices Vt are generated due to the velocity difference between the main air flow from the main flow passage 210 and the stationary air around the main air flow at a downstream side of the outlet of the main flow passage 210. The main air flow is diffused by the lateral vortex Vt, and at the same time, the stationary air outside the device (that is, the external fluid) is drawn into the main air flow, so that the reaching distance of the main air flow is shortened in the fluid discharge device CE. In this case, the lateral vortices Vt are combined with each other, and the lateral vortices Vt may develop into a larger lateral vortex Vt. Further, when stationary air that is stationary outside the device is drawn into the main air flow, the temperature or humidity of the main air flow changes. Therefore, it may be difficult for the conditioned air adjusted to an appropriate temperature or humidity to reach a desired space. The lateral vortex is a vortex, in which the vortex axis as the central axis of the vortex is substantially perpendicular to the main flow direction.

Figure 10:
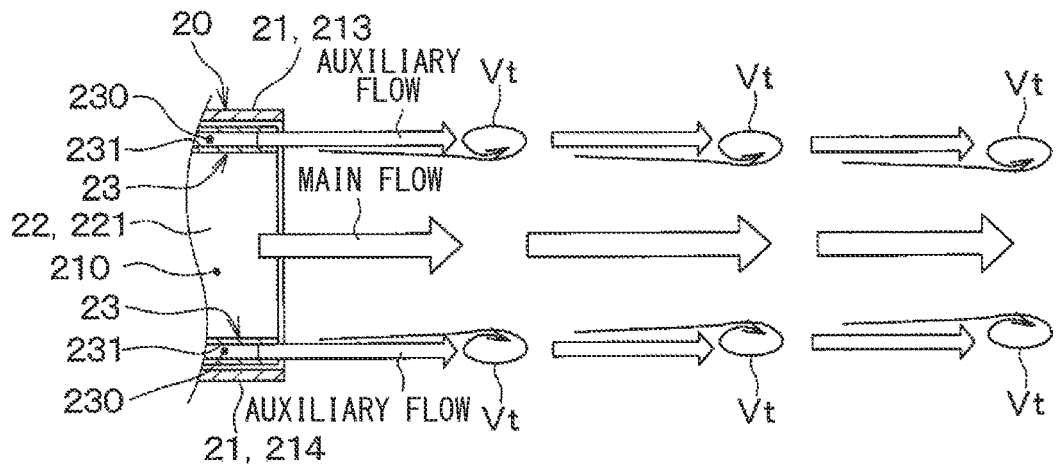
FIG. 10 is a diagram for explaining a state of the airflow blown from the grill portion of the fluid discharge device according to the first embodiment.

In contrast, in the fluid discharge device 1 of the present embodiment, as shown in FIG. 10, the auxiliary flow blown out from the auxiliary flow passage 230 flows in parallel with the main flow blown from the main flow passage 210, and flows together with the main flow in the outer region of the main flow passage 210.

According to this, the lateral vortex Vt formed in the main flow is disturbed by the auxiliary flow, and the development of the lateral vortex Vt can be suppressed. This suppresses the diffusion of the main flow and the drawing of stationary air (that is, external fluid) outside the device into the main flow. As a result, the reaching distance of the main flow can be increased. Further, when the development of the lateral vortex Vt is suppressed, it becomes difficult for the stationary air outside the device to be drawn into the main flow. Therefore, the conditioned air adjusted to an appropriate temperature or humidity easily reaches a desired space.

Further, in the fluid discharge device 1 of the present embodiment, the auxiliary flow passage 230 is formed by the sub-frame body 23 provided at the adjustment fin 22, such that the direction of the main flow blown out from the main flow passage 210 changes in synchronization with the direction of the auxiliary flow blown from the auxiliary flow passage 230.

The fluid discharge device 1 described above has a structure in which the auxiliary flow discharged from the auxiliary flow passage 230 flows together and in parallel with the main flow discharged from the outside area within the main flow passage 210. Since the development of the lateral vortex Vt formed in the main flow can be suppressed by the auxiliary flow, it is possible to suppress the diffusion of the main flow and the suction of the external fluid outside the device into the main flow. As a result, the reaching distance of the main stream can be increased.

In addition, the fluid discharge device 1 is configured to change the direction of the auxiliary flow to be matched with the direction of the main flow when adjusting the direction of the air flow blown from the opening 101. According to this, even if the direction of air blown out from the opening 101 is adjusted, a development of the lateral vortex Vt generated around the main flow can be suppressed by the auxiliary flow. As a result, the reaching distance of the main flow can be increased.

In particular, the fluid discharge device 1 is provided with the sub-frame bodies 23 forming the auxiliary flow passage 230 at the two end sides of the adjustment fins 22 in the longitudinal direction of the adjustment fins 22. According to this, the development of the lateral vortex Vt formed in the main flow near the two end sides of the adjustment fin 22 can be suppressed.

The sub-frame body 23 is provided at the adjustment fin 22 so that a part of the main flow passage 210 and the auxiliary flow passage 230 overlap each other in the circumferential direction of the main frame body 21. According to this, the auxiliary flow discharged from the auxiliary flow passage 230 is easy to flow together and in parallel with the main flow flowing in the outside area of the main flow passage 210 among the main flow discharged from the main flow passage 210. Therefore, the development of the lateral vortex formed near the outside area in the main flow can be further suppressed.

Further, the sub-frame body 23 is provided at the end of the plate portion 221 of the adjustment fin 22 in the longitudinal direction. As a result, the auxiliary flow discharged from the auxiliary flow passage 230 can easily flow in parallel with and adjacent to the main flow flowing in the outside area within the main flow passage 210. Thus, the development of the lateral vortex Vt formed in the main flow near the two end sides of the adjustment fin 22 can be effectively suppressed.

Further, the sub-frame body 23 is formed in a tubular shape, and the auxiliary flow passage 230 is defined by the inner wall portion 231 of the sub-frame body 23. In this way, because the auxiliary flow passage 230 is formed by the inner wall portion 231 of the tubular sub-frame body 23, the auxiliary flow passage 230 can be easily added to the fluid discharge device 1 having the main flow passage 210.

Second Embodiment

Next, a second embodiment will be described with reference to FIGS. 11 and 12. In the present embodiment, the flow passage shape of an auxiliary flow passage 230 is different from that of the first embodiment. In the present embodiment, a difference part different from the first embodiment will be mainly described, and description for a part similar to the first embodiment will be omitted.

In a flow passage 100 inside a duct 10, the flow velocity of the airflow near the wall surface tends to be smaller than that at a position away from the wall surface due to wall surface loss. Therefore, if the sub-frame bodies 23 are simply provided in the outside portions 220a and 220b of the adjustment fins 22 closer to the wall surface defining the flow passage 100, the flow rate of the fluid flowing through the auxiliary flow passage 230 may be insufficient.

Figure 11:
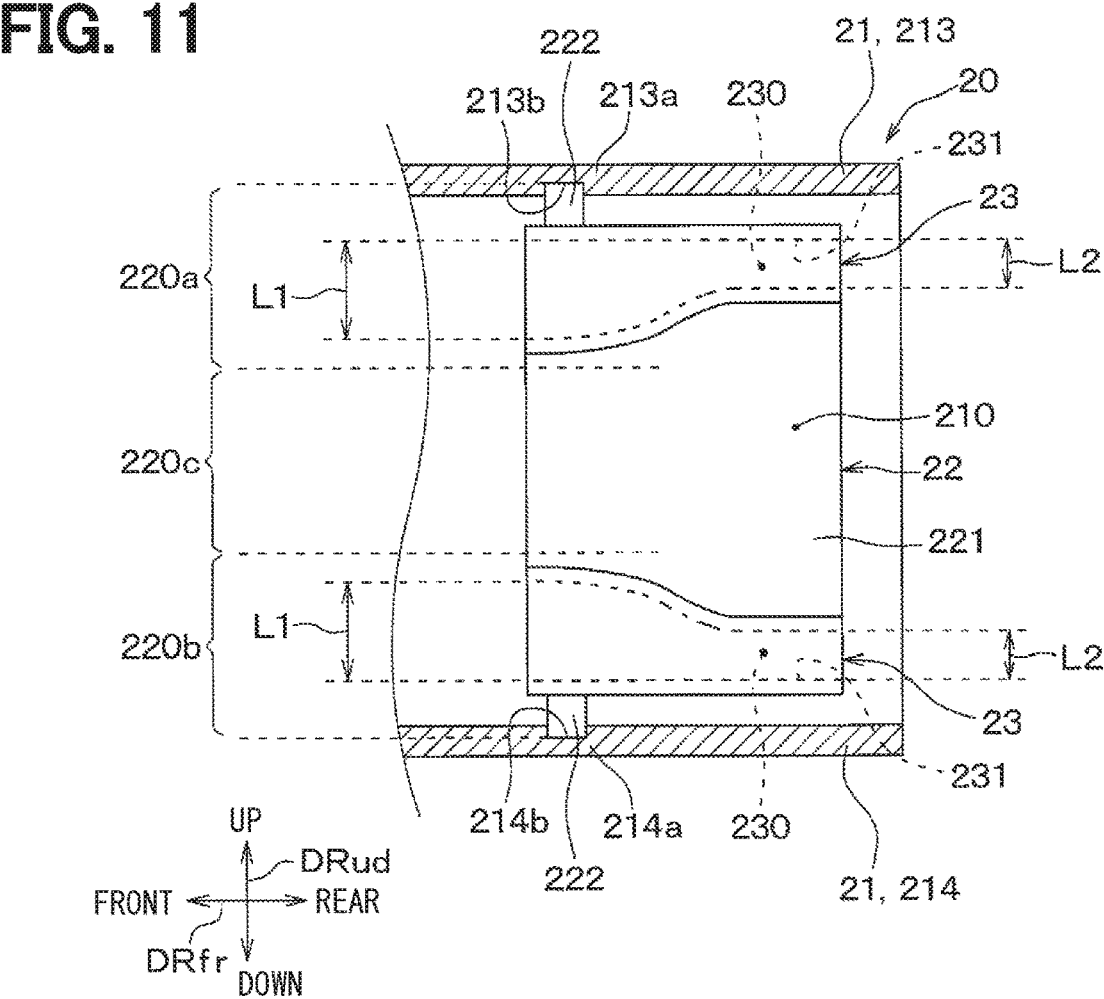
FIG. 11 is a schematic cross-sectional view of a grill portion of a fluid discharge device according to a second embodiment.
Figure 12:
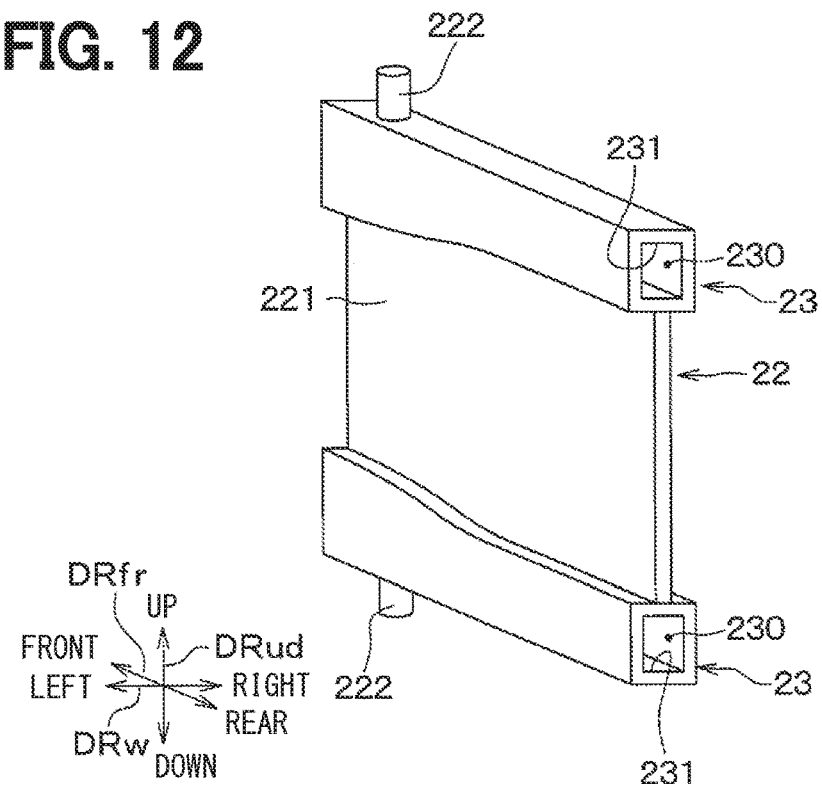
FIG. 12 is a schematic perspective view of an adjustment fin of the fluid discharge device according to the second embodiment.

In the second embodiment, as shown in FIGS. 11 and 12, the sub-frame body 23 is configured such that a cross-sectional area of the auxiliary flow passage 230 on an upstream side of the air flow is larger than that on a downstream side of the air flow of the auxiliary flow passage 230.

Specifically, in the sub-frame body 23, a vertical dimension L1 of an opening at an upstream end of the auxiliary flow is larger than a vertical dimension L2 of an opening at a downstream end of the auxiliary flow. In other words, the size of the sub-frame body 23 in the longitudinal direction of the plate portion 221 of the adjustment fin 22 is larger on the upstream side than on the downstream side of the auxiliary flow.

The other configurations are the same as those of the first embodiment. The other parts of the fluid discharge device 1 according to the present embodiment have configurations similar to that of the first embodiment. Therefore, the action and effect produced by the configuration of the first embodiment can be obtained in the same manner as in the first embodiment. The same also applies to the following embodiments.

In particular, in the fluid discharge device 1 of the present embodiment, the cross-sectional area of the auxiliary flow passage 230 is larger on the upstream side than on the downstream side in the auxiliary flow direction. According to this, the air easily flows from the flow passage 100 to the auxiliary flow passage 230. Therefore, it is possible to sufficiently secure the flow rate of the air flowing through the auxiliary flow passage 230. As a result, the development of the lateral vortex Vt formed in the main flow can be sufficiently suppressed by the auxiliary flow.

Modification to the Second Embodiment

In the second embodiment described above, the cross-sectional area of the auxiliary flow passage 230 is changed between the upstream side and the downstream side of the auxiliary flow, by changing the dimension of the sub-frame body 23 in the longitudinal direction of the plate portion 221 of the sub-frame body 23. However, the present disclosure is not limited to this.

For example, a dimension of the sub-frame body 23 in a direction perpendicular to the longitudinal direction of the plate portion 221 may be changed between the upstream side and the downstream side of the auxiliary flow, so as to change the cross-sectional area of the auxiliary flow passage 230. If the sub-frame bodies 23 provided at the adjustment fins 22 adjacent to each other are too close to each other, the auxiliary flow discharged from the adjacent auxiliary flow passages 230 may interfere with each other. Therefore, it is desirable to set a predetermined distance between the adjacent adjustment fins 22 adjacent to each other so that the sub-frame bodies 23 provided at the adjacent adjustment fins 22 do not come too close to each other.

Third Embodiment

Figure 13:
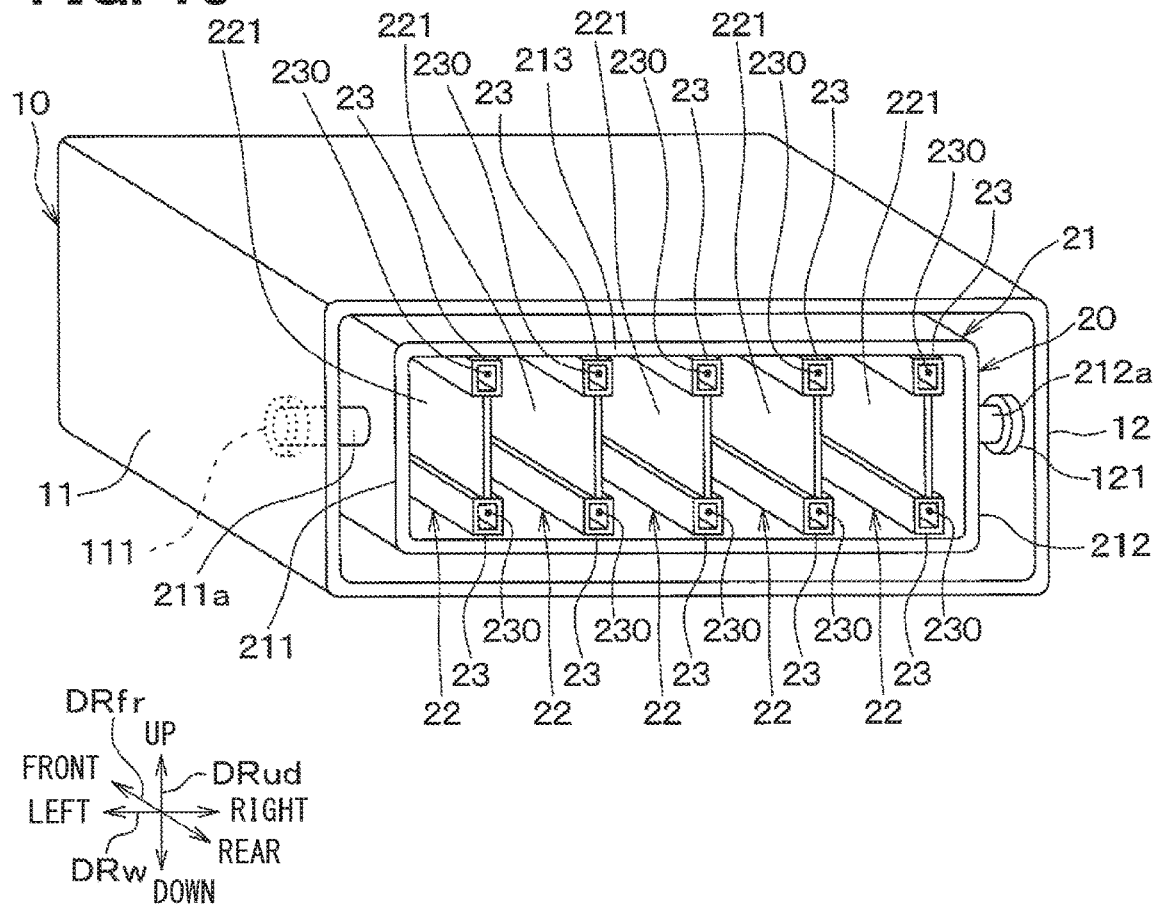
FIG. 13 is a schematic perspective view of a fluid discharge device according to a third embodiment.

Next, a third embodiment will be described with reference to FIGS. 13 and 14. The present embodiment is different from the first embodiment in that a grill portion 20 is configured such that the direction of the airflow can be adjusted not only in the left-right direction DRw but also in the up-down direction DRud. In the present embodiment, a difference part different from the first embodiment will be mainly described, and description for a part similar to the first embodiment will be omitted.

In the grill portion 20, the main frame body 21 is rotatably supported with respect to the duct 10. That is, in the main frame body 21, the left frame 211 and the right frame 212 extending along the longitudinal direction of the adjustment fin 22 are rotatably supported with respect to the duct 10.

Specifically, the left frame 211 and the right frame 212 are provided with rotation pins 211a and 212a protruding to the duct 10. The duct 10 is provided with fitting portions 111, 121 into which the rotation pins 211a, 212a of the main frame body 21 are respectively fitted into the pair of side walls 11, 12 facing the left frame 211 and the right frame 212.

Figure 14:
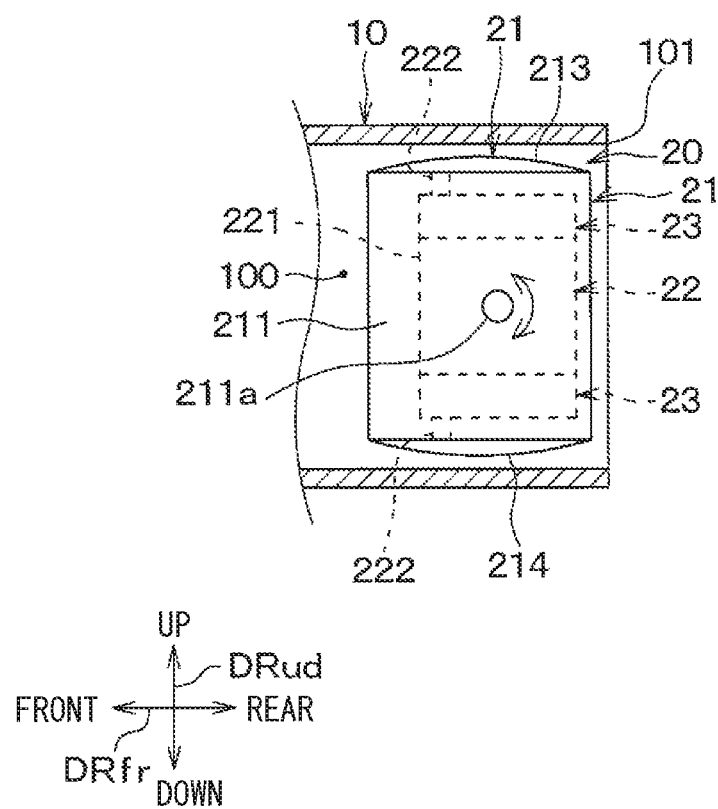
FIG. 14 is a schematic cross-sectional view of a grill portion of the fluid discharge device according to the third embodiment.

The main frame body 21 is rotatable about the rotation pins 211a and 212a as shown in FIG. 14 by rotatably fitting the rotation pins 211a and 212a of the main frame body 21 into the fitting portions 111 and 121 of the duct 10.

The other configurations are the same as those of the first embodiment. In the fluid discharge device 1 of the present embodiment, the main frame body 21 of the grill portion 20 is rotatably supported with respect to the duct 10. Accordingly, the direction of the airflow can be adjusted by rotating the main frame body 21 with respect to the duct 10, in addition to the adjustment of the direction of the airflow by rotating the adjustment fins 22. Therefore, the degree of freedom when adjusting the direction of the airflow blown from the opening 101 can be improved.

Fourth Embodiment

Next, a fourth embodiment will be described with reference to FIGS. 15 and 16. In the present embodiment, the position where the sub-frame body 23 is provided is different from that in the first embodiment. In the present embodiment, a difference part different from the first embodiment will be mainly described, and description for a part similar to the first embodiment will be omitted.

Figure 15:
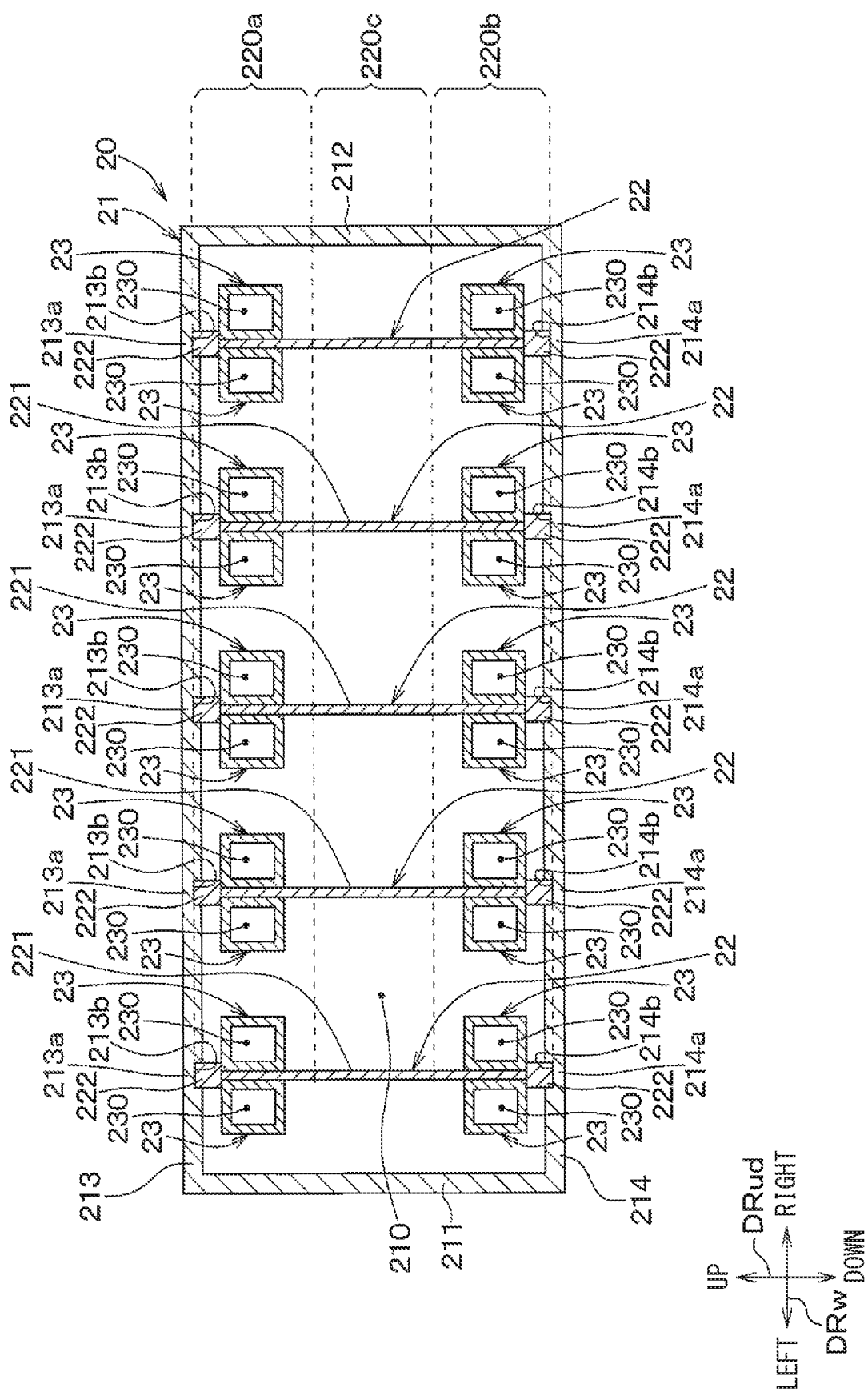
FIG. 15 is a schematic cross-sectional view of a grill portion of a fluid discharge device according to a fourth embodiment.
Figure 16:
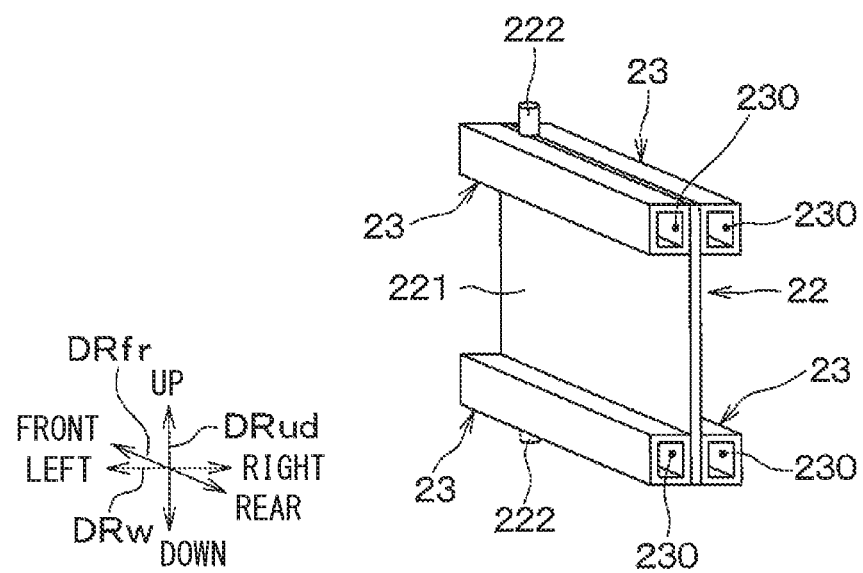
FIG. 16 is a schematic perspective view of an adjustment fin of the fluid discharge device according to the fourth embodiment.

As shown in FIGS. 15 and 16, the sub-frame body 23 is formed in a tubular shape, and is provided at both sides of the plate surface of the plate portion 221. Specifically, the sub-frame body 23 is provided on both sides of the plate surface of the plate portion 221 constituting the first outside portion 220a and the second outside portion 220b of the adjustment fin 22.

The other configurations of the present embodiment are the same as those of the first embodiment. In the fluid discharge device 1 of the present embodiment, the sub-frame body 23 is positioned on both sides of the plate surface of the plate portion 221 of the adjustment fin 22. According to this, the auxiliary flow discharged from the auxiliary flow passage 230 is easy to flow together and in parallel with the main flow flowing in the outside area of the main flow passage 210 among the main flow discharged from the main flow passage 210. Therefore, the development of the lateral vortex Vt formed near the outside area in the main flow can be further effectively suppressed.

Modification of Fourth Embodiment

In the fourth embodiment described above, an example in which the sub-frame bodies 23 are arranged respectively in contact with the two sides of the plate surface of the plate portion 221 has been described, but the present disclosure is not limited to this. If the sub-frame bodies 23 provided at the adjustment fins 22 adjacent to each other are too close to each other, the auxiliary flow discharged from the adjacent auxiliary flow passages 230 may interfere with each other. Therefore, for example, the sub-frame body 23 and the plate portion 221 may be connected via a connection member so that the sub-frame body 23 is separated from the plate surface of the plate portion 221.

Fifth Embodiment

Next, a fifth embodiment will be described with reference to FIGS. 17 and 18. In the present embodiment, the shape of the sub-frame body 23 is different from that of the first embodiment. In the present embodiment, a difference part different from the first embodiment will be mainly described, and description for parts similar to the first embodiment will be omitted.

Figure 17:
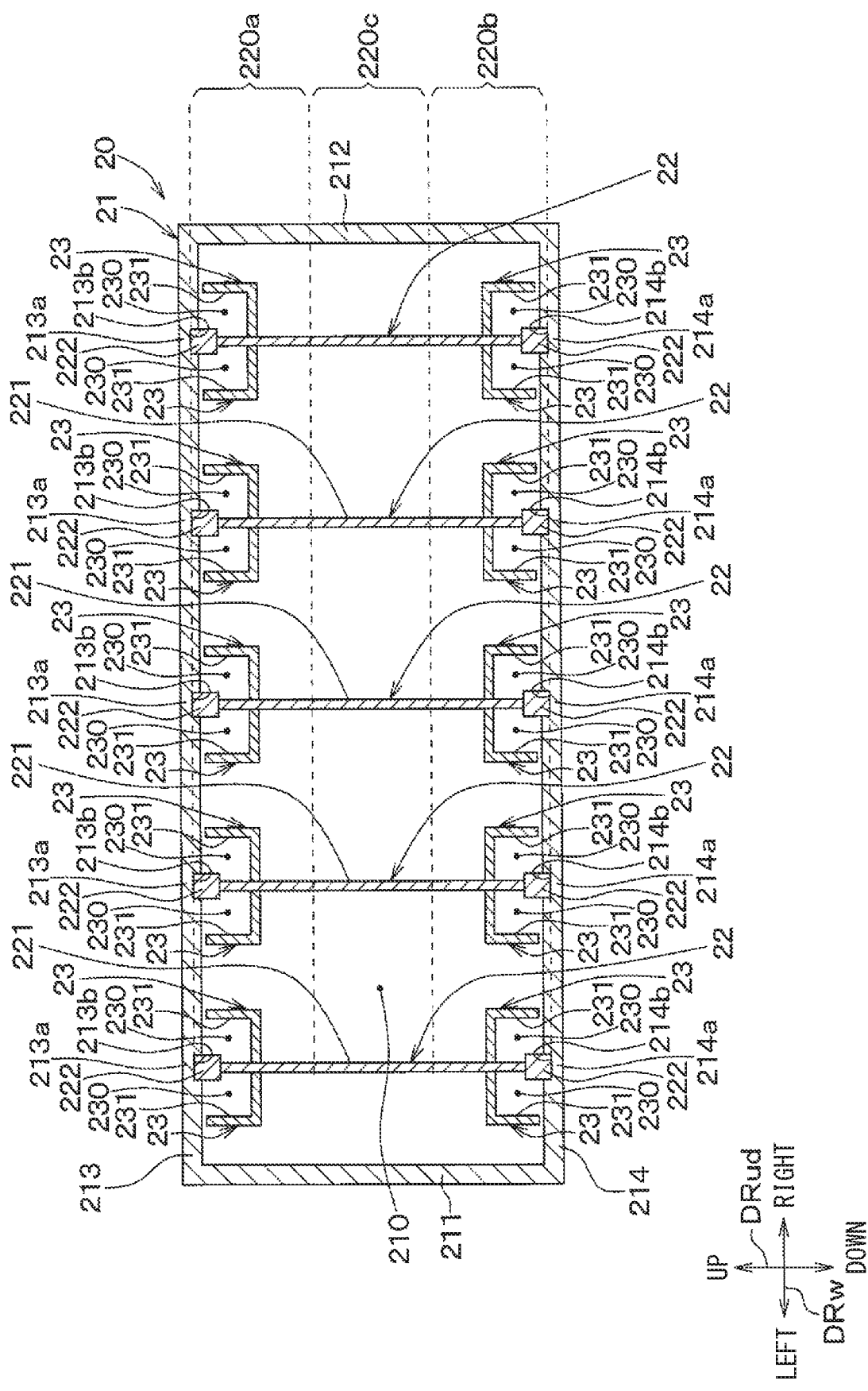
FIG. 17 is a schematic cross-sectional view of a grill portion of a fluid discharge device according to a fifth embodiment.
Figure 18:
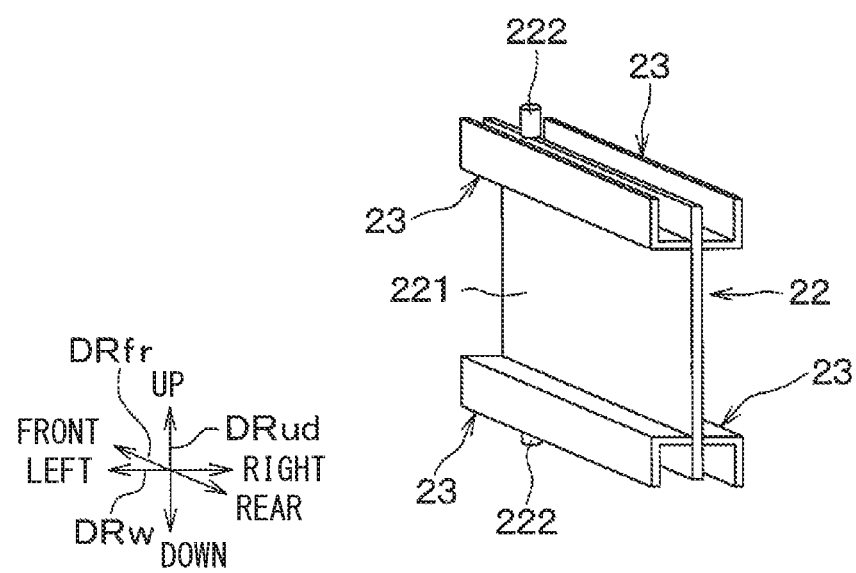
FIG. 18 is a schematic perspective view of an adjustment fin of the fluid discharge device according to the fifth embodiment.

As shown in FIGS. 17 and 18, the sub-frame body 23 has a shape that covers facing wall portions 213a and 214a including a portion of the main frame body 21, facing the end of the adjustment fin 22 in the longitudinal direction of the adjustment fin 22. The auxiliary flow passage 230 is formed by an inner wall portion 231 of the sub-frame body 23 and the facing wall portions 213a and 214a of the main frame body 21. Specifically, the sub-frame body 23 having an L-shape part is provided at both sides of the plate surface of the plate portion 221.

The other configurations are the same as those of the first embodiment. The auxiliary flow passage 230 is formed by the inner wall portion 231 of the sub-frame body 23 and the facing wall portions 213a and 214a of the main frame body 21. According to this, the auxiliary flow discharged from the auxiliary flow passage 230 is easy to flow together and in parallel with the main flow flowing in the outside area of the main flow passage 210 among the main flow discharged from the main flow passage 210. Therefore, the development of the lateral vortex Vt formed near the outside area in the main flow can be further suppressed.

Modification of the Fifth Embodiment

In the fifth embodiment described above, an example in which the sub-frame body 23 is arranged at the two sides of the plate surface of the plate portion 221 has been described, but the present disclosure is not limited to this. The sub-frame body 23 may be provided at an end of the plate portion 221 or one side of the plate surface of the plate portion 221. Further, the sub-frame body 23 is not limited to an L-shape, and may have, for example, a shape extending linearly or a shape curved in an arc shape.

Sixth Embodiment

Next, a sixth embodiment will be described with reference to FIGS. 19 to 22. The present embodiment is different from the first embodiment in that a grill portion 20 is configured to include lateral fins 24 and vertical fins 26. In the present embodiment, a difference part different from the first embodiment will be mainly described, and description for a part similar to the first embodiment will be omitted.

Figure 19:
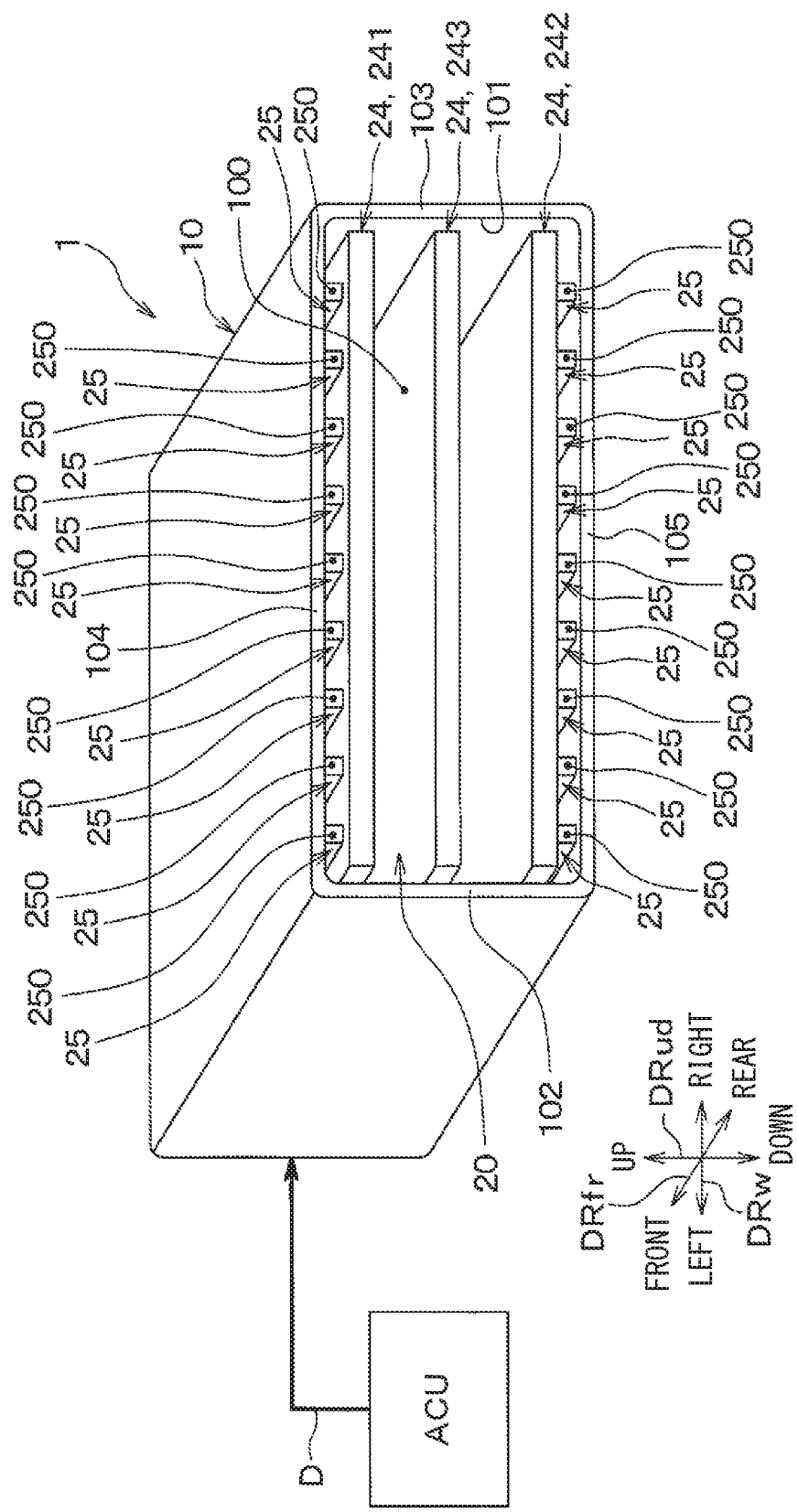
FIG. 19 is a schematic perspective view of a fluid discharge device according to a sixth embodiment.
Figure 20:
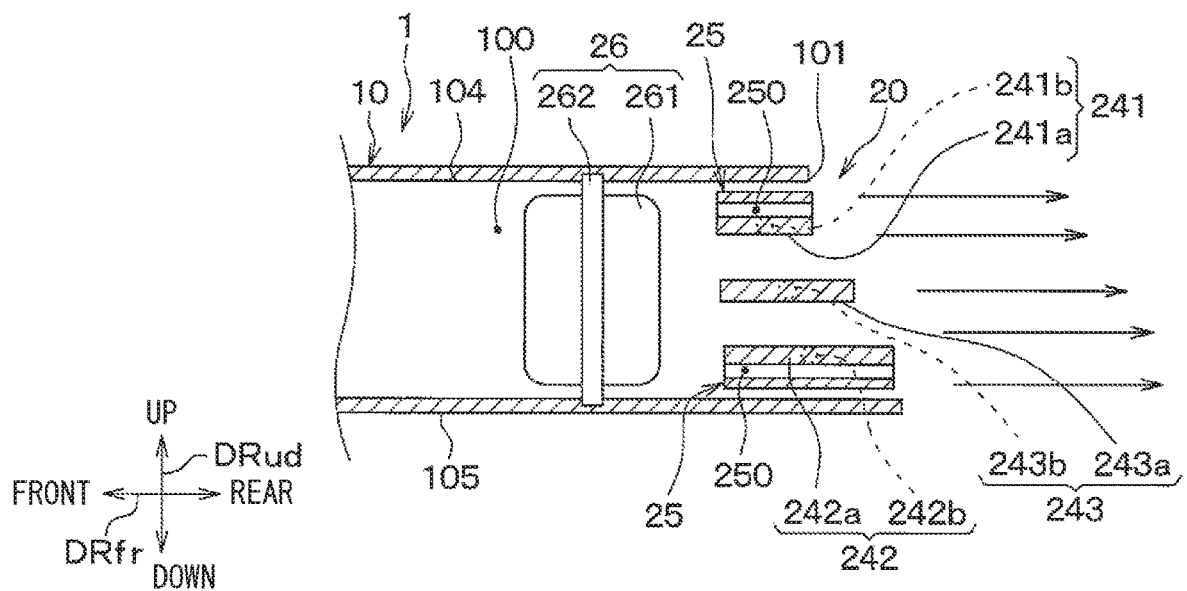
FIG. 20 is a schematic sectional view of the fluid discharge device according to the sixth embodiment.

As shown in FIGS. 19 and 20, the grill portion 20 is configured to include a plurality of lateral fins 24 extending along the left-right direction DRw inside the duct 10, a plurality of vertical fins 26 extending along the up-down direction DRud, and a plurality of sub-frame bodies 25. In the present embodiment, the lateral fins 24 and the vertical fins 26 are configured to form adjustment fins that adjust the direction of the airflow blown out from the opening 101.

The lateral fins 24 change the direction of the airflow blown out from the opening 101 in the up and down direction. The lateral fins 24 are arranged at a position close to the opening 101 inside of the duct 10.

The grill portion 20 of the present embodiment has three lateral fins 24, for example. The three lateral fins 24 are rotatably supported with respect to the left wall portion 102 and the right wall portion 103 of the duct 10. The number of lateral fins 22 arranged in the grill portion 20 is not limited to 3, and may be less than 3 or may be equal to or more than 4. That is, at least one lateral fin 24 may be arranged in the grill portion 20.

The three lateral fins 24 are a first lateral fin 241 facing an upper wall portion 104 of the duct 10, a second lateral fin 242 facing a lower wall portion 105 of the duct 10, and a third lateral fin 243 arranged between the first lateral fin 242 and the second lateral fin 242. In each of the lateral fins 241, 242, 243, the ends of the lateral fins 241, 242, 243 in the longitudinal direction (i.e., left-right direction DRw in this example) are rotatably supported to the left wall portion 102 and the right wall portion 103 of the duct 10.

The lateral fins 241, 242, 243 are provided respectively with flat plate portions 241a, 242a, 243a extending horizontally along the left-right direction DRw, and rotation pins located at the longitudinal ends of the flat plate portions 241a, 242a, 243a. Although not shown, the rotation pins 241b, 242b, 243b have a size that allows them to be fitted into fitting grooves formed in the left wall portion 102 and the right wall portion 103 of the duct 10. Further, the lateral fins 241, 242, 243 are connected by a connection member so as to change their postures while being operatively linked with each other. An actuator (not shown) is connected to the connection member, and the plurality of lateral fins 241, 242, 243 are driven by an actuator.

The vertical fin 26 changes the direction of the airflow blown out from the opening 101 in left and right direction. The vertical fins 26 are arranged at positions inside of the duct 10 at an upstream side of the lateral fins 24 so as not to interfere with the lateral fins 24.

At least one vertical fin 26 is arranged in the grill portion 20 of the present embodiment. The ends of the vertical fin 26 in the longitudinal direction (i.e., the up-down direction DRud in this example) are rotatably supported with respect to the upper wall portion 104 and the lower wall portion 105 of the duct 10.

The vertical fin 26 includes a plate portion 261 extending along the up-down direction DRud, and two rotation pins 262 provided at the two ends in the longitudinal direction of the plate portion 221. Although not shown, the rotation pins 262 have a size that allows them to be fitted into fitting grooves formed in the upper wall portion 104 and the lower wall portion 105 of the duct 10. An actuator (not shown) is connected to the vertical fin 26. The vertical fin 26 is driven by this actuator.

Here, in the grill portion 20, the lateral fins 24 and the vertical fins 26 are rotatable respectively and separately. Thus, it possible to freely adjust the direction of the airflow blown out from the opening 101.

The sub-frame body 25 defines an auxiliary flow passage 250 that guides a part of the air flowing through the flow passage 100 into the opening 101 as the auxiliary flow. The sub-frame body 25 is formed in a tubular shape. The auxiliary flow passage 250 is formed by an inner wall portion of the sub-frame body 25. The sub-frame body 25 of the present embodiment is configured so that the cross-sectional area of the auxiliary flow passage 250 is substantially constant.

The sub-frame body 25 is provided with respect to the lateral fins 24 so that the direction of the auxiliary flow blown out from the auxiliary flow passage 250 is aligned with the direction of the main flow blown out from the flow passage 100. In the present embodiment, a plurality of sub-frame bodies 25 are provided on the upper surface of the first lateral fin 241 and the lower surface of the second lateral fin 242. Because the sub-frame bodies 25 are provided on the upper surface of the first lateral fin 241 and the lower surface of the second lateral fin 242, the auxiliary flow passages 250 are formed between the inner wall surface of the duct 10 and the first lateral fin 241, and between the inner wall surface of the duct 10 and the second lateral fin 242.

Specifically, on the first lateral fin 241, a plurality of sub-frame bodies 25 are arranged side by side in the left-right direction DRw at a regular interval with respect to the upper surface of the first lateral fin 241. The plurality of sub-frame bodies 25 are provided on the upper surface of the first lateral fin 241, and extend along the front-rear direction DRfr.

Specifically, on the second lateral fin 242, a plurality of sub-frame bodies 25 are arranged side by side in the left-right direction DRw at a regular interval with respect to the lower surface of the second lateral fin 242. The plurality of sub-frame bodies 25 are provided on the lower surface of the second lateral fin 242, and extend along the front-rear direction DRfr. The third lateral fin 243 is not provided with the sub-frame body 25.

The distance between the adjacent sub-frame bodies 25 is larger than a width dimension of each sub-frame body 25 in the left-right direction DRw. As a result, the auxiliary flow passages 250 formed inside the sub-frame body 25 has a sufficiently smaller cross-sectional area than the flow passage through which the main flow formed between the adjacent sub-frame bodies 25 passes.

When the air conditioning unit ACU operates, the conditioned air with a temperature or humidity adjusted by the air conditioning unit ACU, flows into the fluid discharge device 1 through an air conditioning duct. The conditioned air flowing into the fluid discharge device 1 flows through the flow passage 100 of the duct 10, and a part thereof flows into the auxiliary flow passage 250. Then, as shown in FIG. 20, the conditioned air flowing through the flow passage 100 and the auxiliary flow passage 250 is blown into the vehicle interior.

Figure 21:
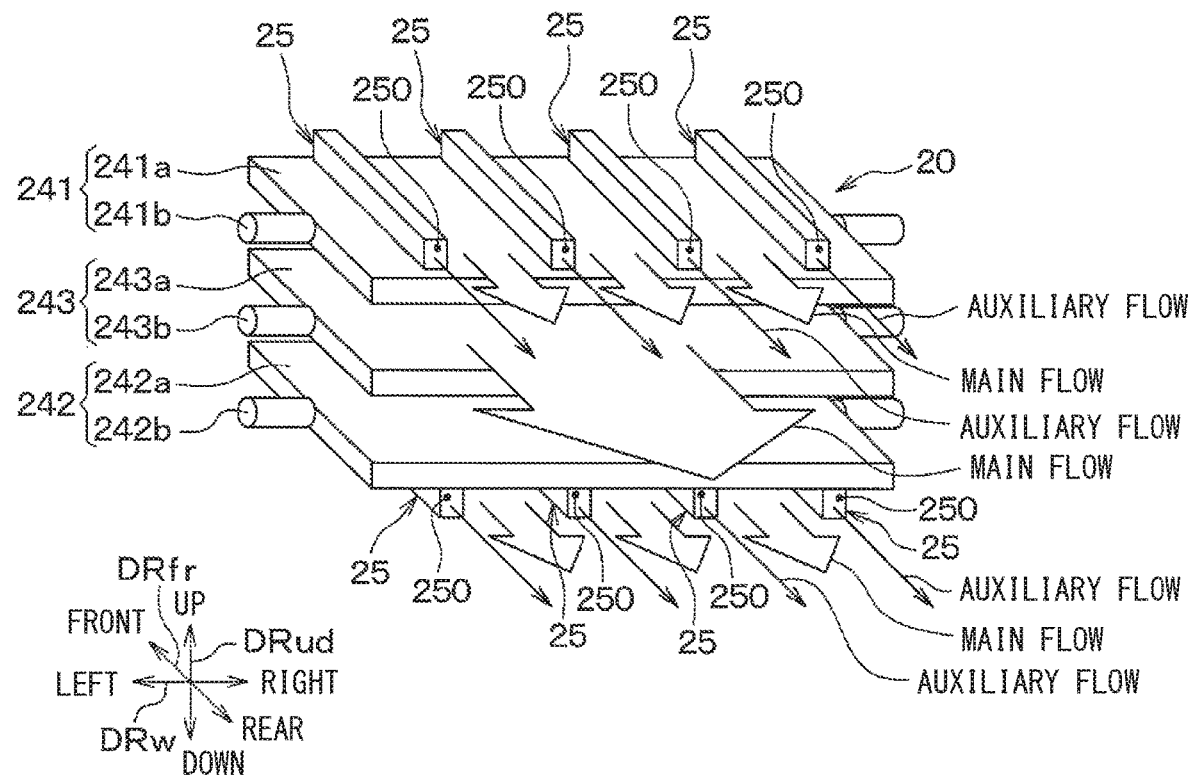
FIG. 21 is a schematic perspective view of a grill portion of the fluid discharge device according to the sixth embodiment.
Figure 22:
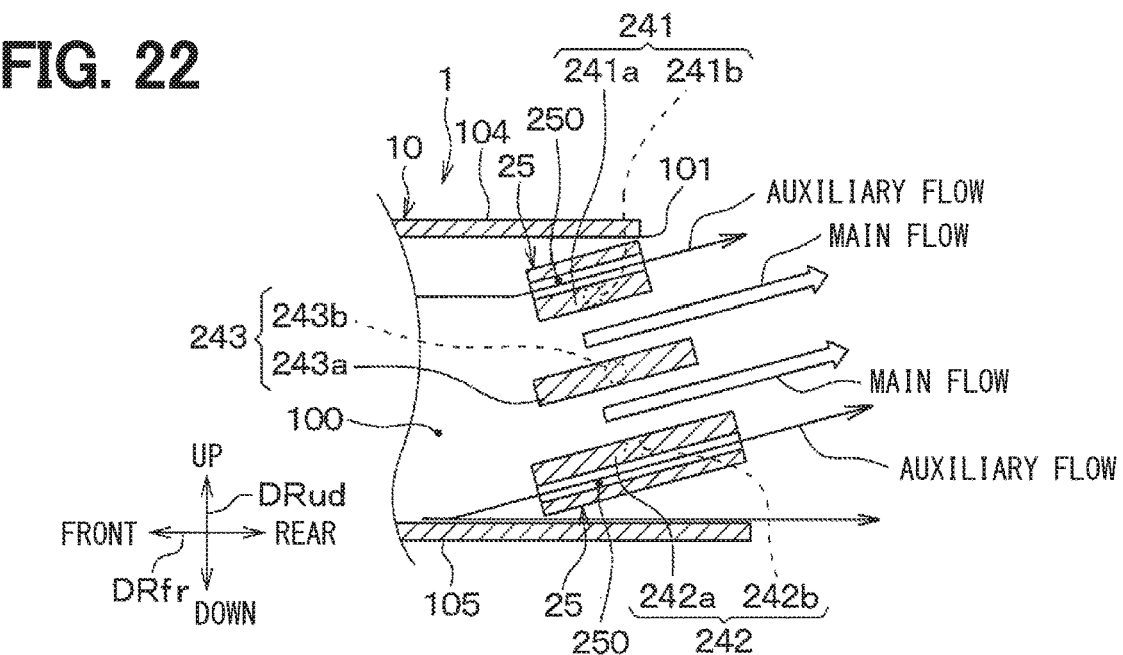
FIG. 22 is a diagram for explaining a relationship between a main flow and an auxiliary flow blown from the grill portion of the fluid discharge device according to the sixth embodiment.

As shown in FIGS. 21 and 22, the auxiliary flow of air blown out from the auxiliary flow passage 250 flows together in parallel with the main flow of air flowing through the flow passage between the first lateral fin 241 and the upper wall portion 104, and the main flow of air flowing through the flow passage between the second lateral fin 242 and the lower wall portion 105.

According to this, the lateral vortex formed around the main flow is disturbed by the auxiliary flow, and the development of the lateral vortex is suppressed. This suppresses the diffusion of the main flow and the drawing of stationary air (that is, external fluid) outside the device into the main flow. As a result, the reaching distance of the main flow can be increased. Further, when the development of the lateral vortex is suppressed, it becomes difficult for the stationary air outside the device to be drawn into the main flow. Therefore, the conditioned air adjusted to an appropriate temperature or humidity easily reaches a desired space.

The fluid discharge device 1 described above has a structure in which the auxiliary flow discharged from the auxiliary flow passage 250 flows together and in parallel with the main flow discharged from the outside area of the flow passage 100. Since development of the lateral vortex formed in the main flow can be suppressed by the auxiliary flow, it is possible to suppress a diffusion of the main flow and a suction of an external fluid drawn from the outside of the device into the main flow. As a result, the reaching distance of the main stream can be increased.

Further, in the fluid discharge device 1, the auxiliary flow passage 250 is provided at least between the lateral fin 24 and the inner wall surface of the duct 10. Thus, the auxiliary stream flows substantially in parallel with the main stream flowing along the inner wall surface of the duct 10. Therefore, the development of the lateral vortex formed in the main flow can be reduced by the auxiliary flow.

The opening 101 of the duct 10 has a flat opening shape in which a vertical dimension of the opening 101 is smaller than a horizontal dimension thereof. When the vertical fins 26 are lined up in such the horizontal long opening 101, the vertical fins 26 stand out.

On the other hand, in the fluid discharge device 1, the vertical fins 26 are arranged at a position on the upstream side of the lateral fins 24 inside the duct 10 so as to be difficult to see from an outside. According to this, an influence of the adjustment fin on the design of the grill portion 20 can be suppressed.

Further, when the adjustment fin is made of the lateral fin 24 and the vertical fin 26, the adjustment fin does not protrude outward from the opening 101 when adjusting the direction of the air flow. Therefore, an influence on the design of the grill portion 20 can be suppressed.

First Modification of Sixth Embodiment

Figure 23:
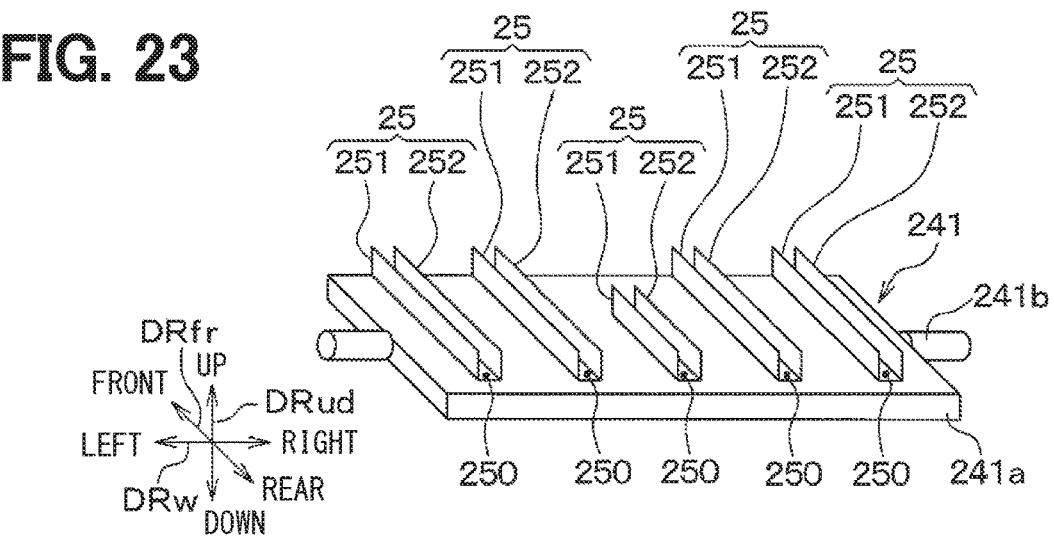
FIG. 23 is a schematic perspective view showing a first modification of a first lateral fin used in the fluid discharge device according to the sixth embodiment.

In the sixth embodiment described above, the sub-frame body 25 provided on the first lateral fin 241 has a tubular shape, but the present invention is not limited to this. For example, as shown in FIG. 23, the sub-frame body 25 may be configured to have a set of side plate portions 251 and 252 standing vertically on the plate surface of the first lateral fin 241. In this case, the auxiliary flow path 250 is formed by a space surrounded by the plate surface of the first lateral fin 241 and a set of side plate portions 251 and 252, and the inner wall of the duct 10. At this time, the lengths of the plurality of sub-frame bodies 25 along the air flow direction do not have to be constant. Although not shown, the sub-frame body 25 provided on the second lateral fin 242 may also have a set of side plate portions 251 and 252.

Second Modification of Sixth Embodiment

Figure 24:
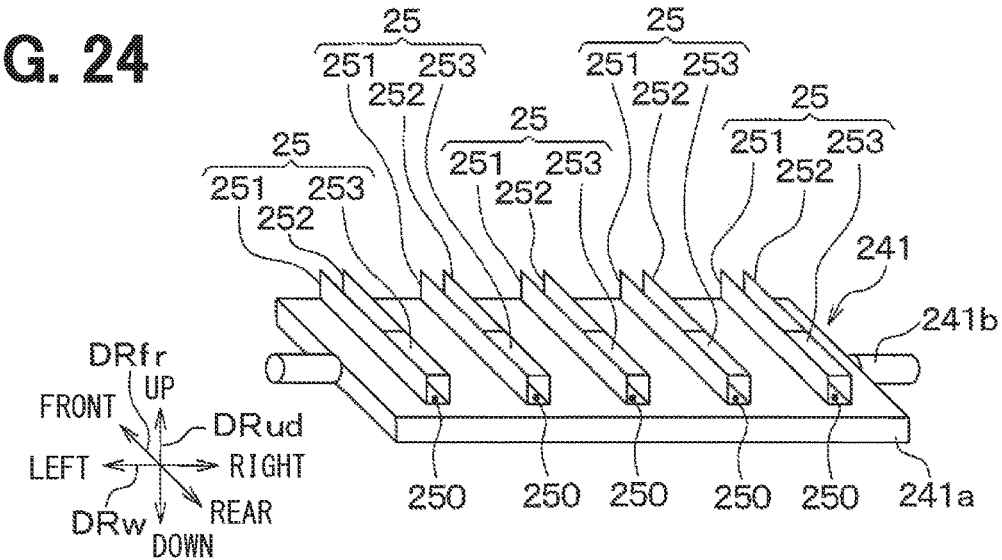
FIG. 24 is a schematic perspective view showing a second modification of a first lateral fin used in the fluid discharge device according to the sixth embodiment.

Further, the sub-frame body 25 provided on the first lateral fin 241 may have a different shape on the upstream side and the downstream side of the air flow. As shown in FIG. 24, the sub-frame body 25 may be made of a set of side plate portions 251 and 252 on the upstream side of the air flow and a tubular body 253 on the downstream side of the air flow. According to this, the sectional area on the upstream side of the air flow in the auxiliary flow passage 250 becomes large, and the air easily flows from the flow passage 100 into the auxiliary flow passage 230. Therefore, it is possible to sufficiently secure the flow rate of the air flowing through the auxiliary flow passage 250. As a result, the development of the lateral vortex formed in the main flow can be sufficiently suppressed by the auxiliary flow. Although not shown, the sub-frame body 25 provided on the second lateral fin 242 may also have a set of side plate portions 251 and 252 and the tubular body 253.

Other Modifications of the Sixth Embodiment

The sub-frame body 25 is not limited to the square cylinder, and may be made of, for example, a round cylinder or a triangular cylinder. The distance between adjacent sub-frame bodies 25 is not necessary to be constant. The plurality of sub-frame bodies 25 may include different shapes and sizes.

In the sixth embodiment described above, the first lateral fin 241 and the second lateral fin 242 are each provided with the sub-frame bodies 25, but the present disclosure is not limited to this. The sub-frame bodies 25 may be provided on one of the first lateral fin 241 and the second lateral fin 242. The same also applies to the following embodiments.

Seventh Embodiment

Next, a seventh embodiment will be described with reference to FIGS. 25 and 26. In the present embodiment, the positions of the lateral fins 24 and the vertical fins 26 are different from those in the sixth embodiment. In the present embodiment, a difference part different from the sixth embodiment will be mainly described, and description for parts similar to the sixth embodiment will be omitted.

Figure 25:
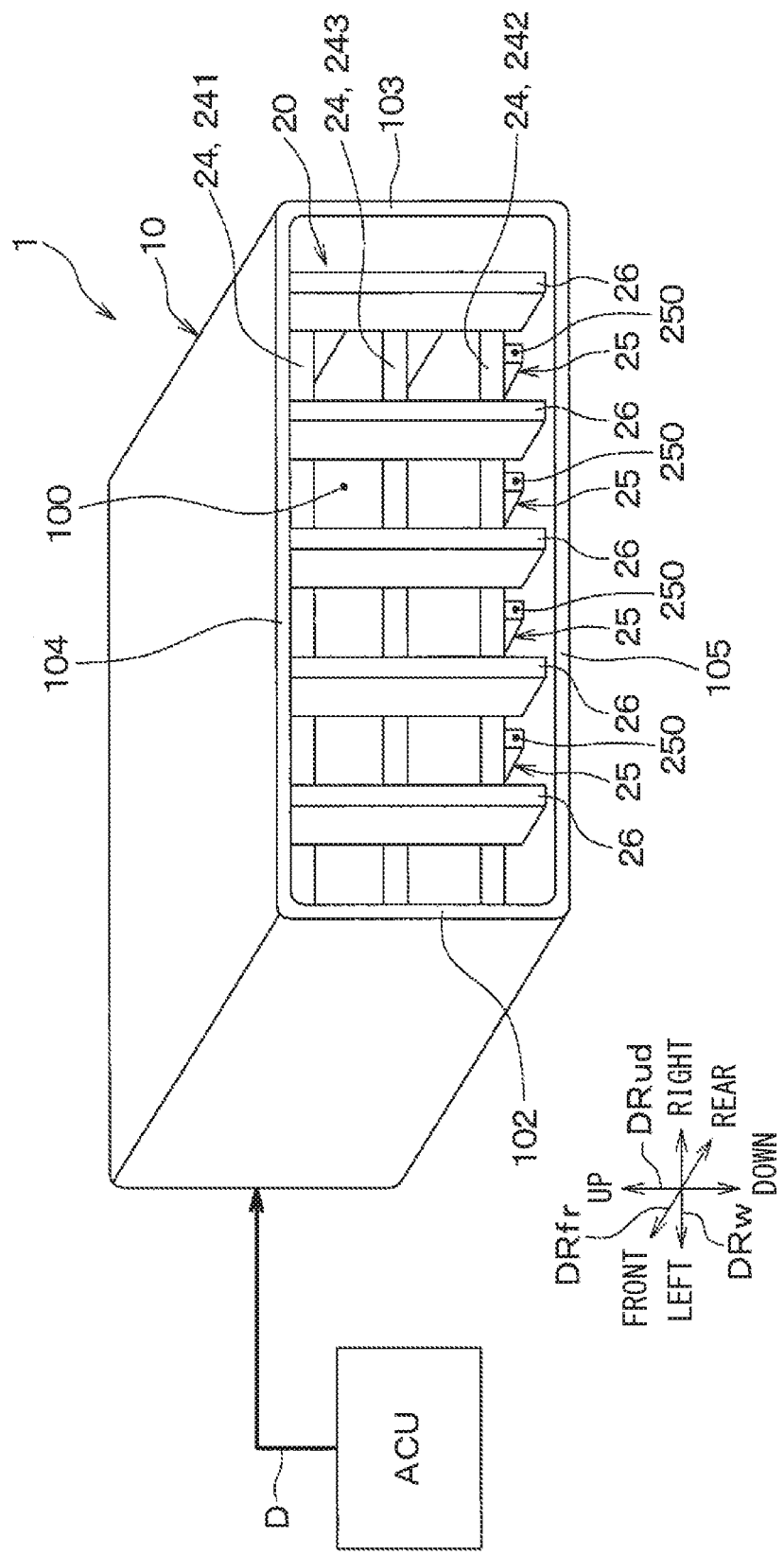
FIG. 25 is a schematic perspective view of a fluid discharge device according to a seventh embodiment.
Figure 26:
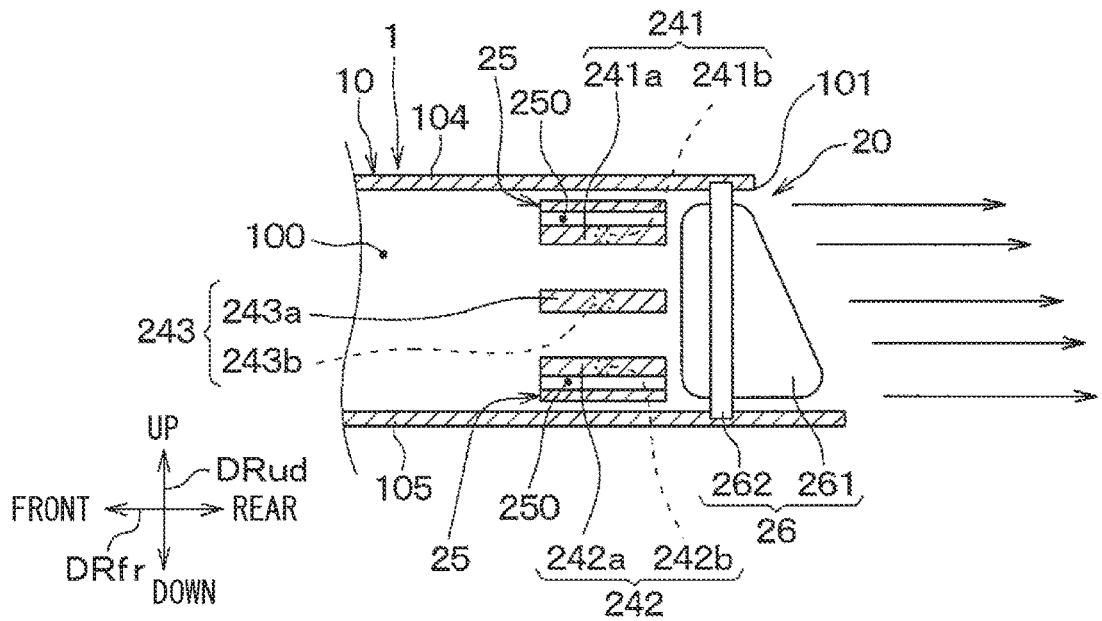
FIG. 26 is a schematic sectional view of the fluid discharge device according to the seventh embodiment.

As shown in FIGS. 25 and 26, in the grill portion 20 of the present embodiment, the positions of the lateral fins 24 and the positions of the vertical fins 26 in the front-rear direction DRfr are reversed with respect to the sixth embodiment. The vertical fins 26 are arranged at a position close to the opening 101 in the inside of the duct 10. The lateral fins 24 are arranged at a position of the inside of the duct 10 on an upstream side of the vertical fin 26.

The other configurations are the same as those of the sixth embodiment. The fluid discharge device 1 of the present embodiment has a structure in which the auxiliary flow discharged from the auxiliary flow passage 250 flows together and in parallel with the main flow discharged from the outside area of the flow passage 100. For that reason, the fluid discharge device 1 according to the present embodiment can obtain the same advantages as those in the sixth embodiment.

Eighth Embodiment

Next, an eighth embodiment will be described with reference to FIGS. 27 and 28. The present embodiment is different from the sixth embodiment in that the sub-frame bodies 25 are provided on both sides of the lateral fin 24. In the present embodiment, a difference part different from the sixth embodiment will be mainly described, and description for a part similar to the sixth embodiment will be omitted.

Figure 27:
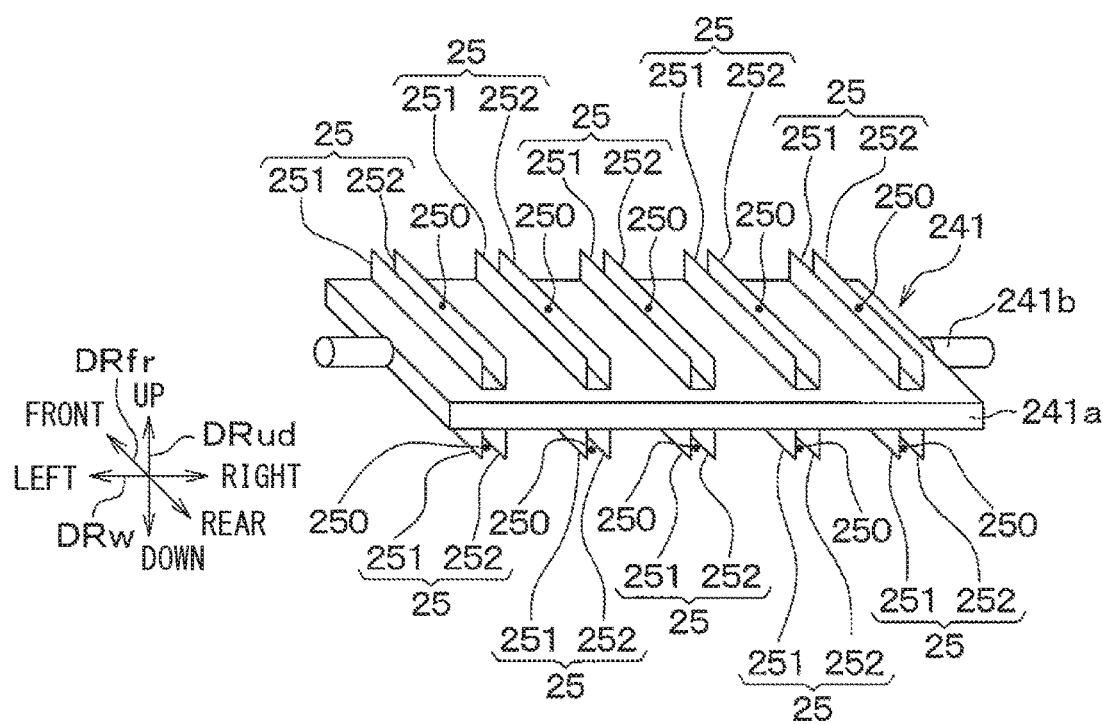
FIG. 27 is a schematic perspective view showing a first lateral fin used in a fluid discharge device according to an eighth embodiment.
Figure 28:
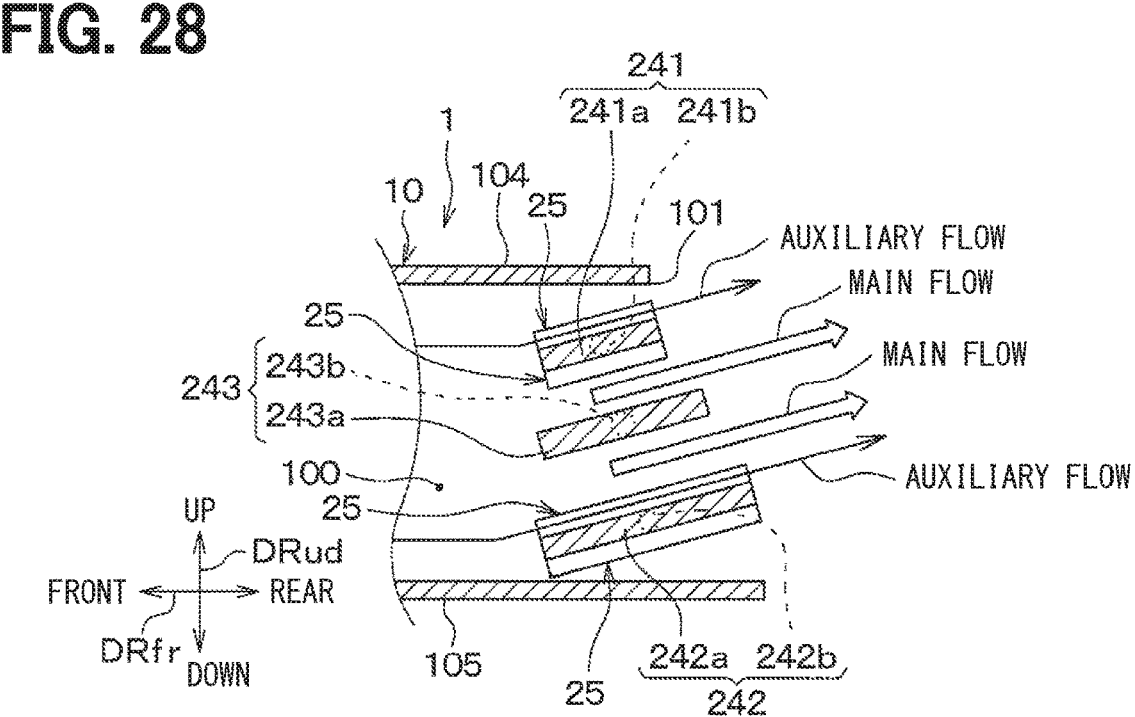
FIG. 28 is a diagram for explaining a relationship between a main flow and an auxiliary flow blown from a grill portion of the fluid discharge device according to the eighth embodiment.

As shown in FIGS. 27 and 28, a plurality of sub-frame bodies 25 are provided on both sides of the first lateral fin 241. Because the sub-frame bodies 25 are provided on the both sides of the first lateral fin 241, the auxiliary flow passages 250 can be formed not only between the inner wall surface of the duct 10 and the first lateral fin 241, but also between the first lateral fin 241 and the third lateral fin 243.

A plurality of sub-frame bodies 25 are provided on both sides of the second lateral fin 242. Because the sub-frame bodies 25 are provided on the both sides of the second lateral fin 242, the auxiliary flow passages 250 can be formed not only between the inner wall surface of the duct 10 and the second lateral fin 242, but also between the second lateral fin 242 and the third lateral fin 243.

Specifically, on the first lateral fin 241 and the second lateral fin 242, a plurality of sub-frame bodies 25 are arranged side by side in the left-right direction DRw at a regular interval with respect to the both surfaces of each of the first lateral fin 241 and the second lateral fin 242. Further, the first lateral fins 241 and the second lateral fins 242 are provided so that the sub-frame body 25 provided on the upper surface and the sub-frame body 25 provided on the lower surface are lined in the up-down direction DRud.

Further, the sub-frame body 25 is configured in the same manner as in the first modification of the sixth embodiment. The sub-frame body 25 may be made of a different one (for example, a tubular frame) different from the first modification of the sixth embodiment.

The other configurations are the same as those of the sixth embodiment. The fluid discharge device 1 of the present embodiment has a structure in which the auxiliary flow discharged from the auxiliary flow passage 250 flows together and in parallel with the main flow discharged from the outside area of the flow passage 100. For that reason, the fluid discharge device 1 according to the present embodiment can obtain the same advantages as those in the sixth embodiment.

In particular, if the auxiliary flow passages 250 are provided on both sides of the first lateral fin 241 and the second lateral fin 242 as in the present embodiment, the auxiliary stream of air easily flows in parallel with the main stream even when the direction of the air flow is adjusted. As a result, the development of the lateral vortex formed in the main flow can be sufficiently suppressed by the auxiliary flow.

Modification of the Eighth Embodiment

Figure 29:
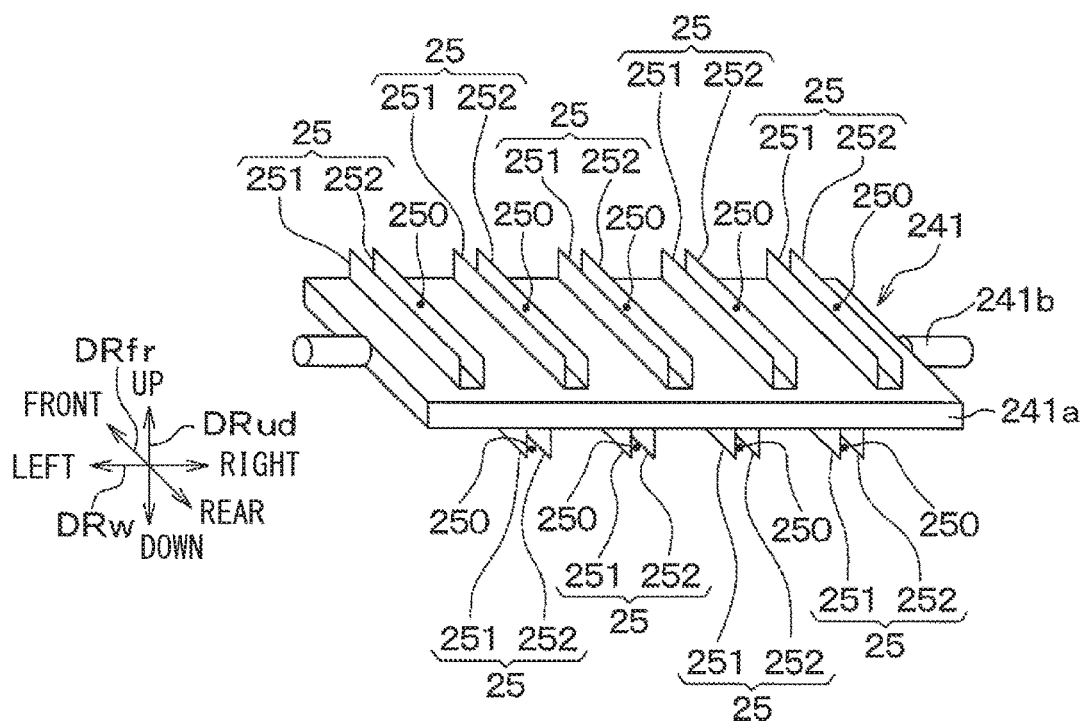
FIG. 29 is a schematic perspective view showing a modification of a first lateral fin used in the fluid discharge device according to the eighth embodiment.

In the eighth embodiment described above, the sub-frame bodies 25 provided on both sides of the first lateral fin 241 and the second lateral fin 242 are provided so as to be lined in the up-down direction DRud, however the present disclosure is limited to this. For example, as shown in FIG. 29, the first lateral fin 241 may be provided so that the sub-frame bodies 25 provided on the upper surface and the sub-frame bodies 25 provided on the lower surface are not lined in the up-down direction DRud. Further, the first lateral fin 241 may be provided with a plurality of sub-frame bodies 25 arranged side by side in the left-right direction DRw at different intervals. The same may be applied to the second lateral fin 242.

Ninth Embodiment

Next, a ninth embodiment will be described with reference to FIG. 30. The present embodiment is different from the sixth embodiment in that the auxiliary flow passages 245 are provided on at least one surface of the lateral fin 24. In the present embodiment, a difference part different from the sixth embodiment will be mainly described, and description for a part similar to the sixth embodiment will be omitted.

Figure 30:
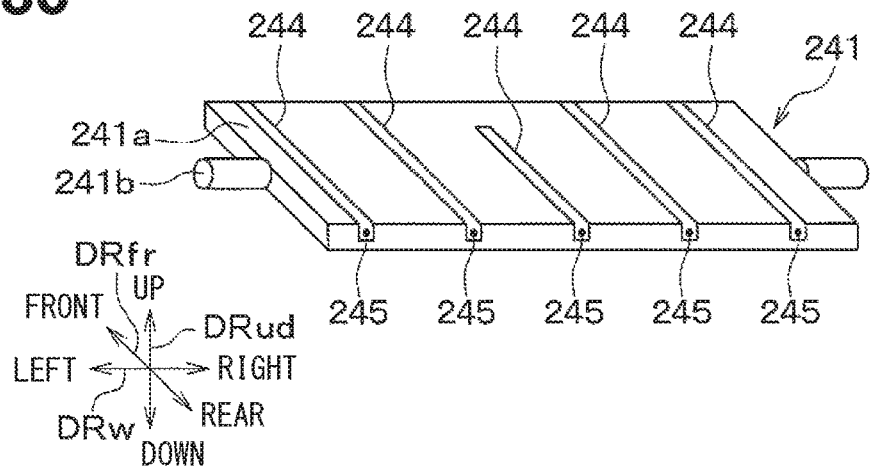
FIG. 30 is a schematic perspective view showing a first lateral fin used in a fluid discharge device according to a ninth embodiment.

As shown in FIG. 30, a plurality of groove portions 244 extending along the front-rear direction DRfr are formed with respect to the upper surface of the first lateral fin 241. Specifically, on the upper surface of the first lateral fin 241, a plurality of concave groove portions 244 are arranged side by side in the left-right direction DRw at regular intervals. The plurality of groove portions 244 define an auxiliary flow passage 245 that guides a part of the air flowing through the flow passage 100 to the opening 101, as the auxiliary flow. That is, the auxiliary flow passage 245 is formed between the inner wall surface of the duct 10 and the first lateral fin 241 by the plurality of groove portions 244 formed on the upper surface of the first lateral fin 241. The plurality of groove portions 244 of the present embodiment include groove portions having different lengths in the front-rear direction DRfr. The plurality of groove portions 244 may have the same length in the front-rear direction DRfr.

Although not shown, a plurality of groove portions 244 extending along the front-rear direction DRfr may be formed with respect to the lower surface of the second lateral fin 242. Specifically, on the lower surface of the second lateral fin 242, a plurality of concave groove portions 244 are arranged side by side in the left-right direction DRw at regular intervals. That is, the auxiliary flow passage 245 is formed between the inner wall surface of the duct 10 and the second lateral fin 242 by the plurality of groove portions 244 formed on the lower surface of the second lateral fin 242.

The other configurations are the same as those of the sixth embodiment. The fluid discharge device 1 of the present embodiment has a structure in which the auxiliary flow discharged from the auxiliary flow passage 250 flows together and in parallel with the main flow discharged from the outside area of the flow passage 100. For that reason, the fluid discharge device 1 according to the present embodiment can obtain the same advantages as those in the sixth embodiment.

In particular, if the auxiliary flow passage 245 is made of a plurality of groove portions 244 formed on one surface of the first lateral fin 241 and the second lateral fin 242 as in the present embodiment, the thickness of the entire fin can be reduced as compared with a configuration in which the sub-frame bodies 25 are provided in each of the lateral fins 241 and 242. In this case, it is not necessary to add a dedicated member for forming the auxiliary flow passage 245. Therefore, the grill portion 20 can be simplified.

Modification of the Ninth Embodiment

Figure 31:
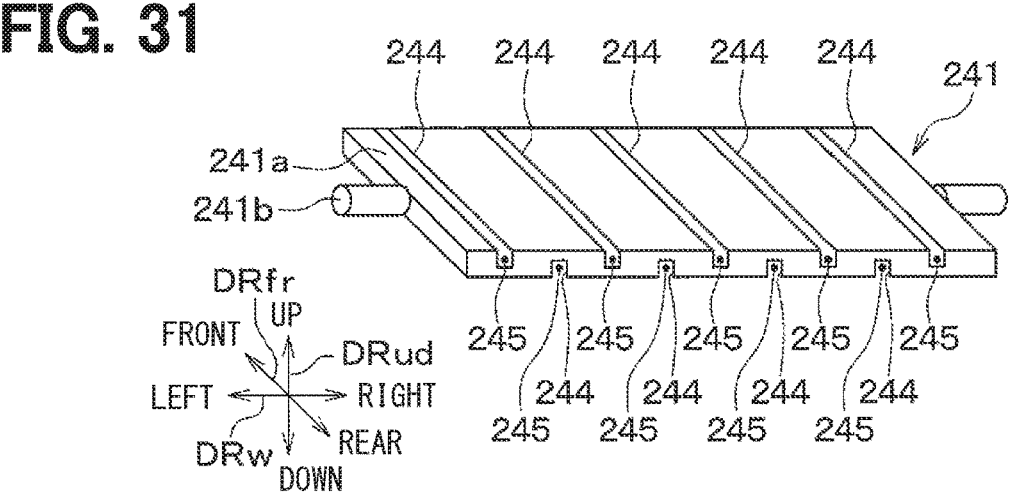
FIG. 31 is a schematic perspective view showing a modification of a first lateral fin used in the fluid discharge device according to the ninth embodiment.

In the ninth embodiment described above, a plurality of groove portions 244 are formed on the upper surface of the first lateral fin 241 and the lower surface of the second lateral fin 242, but the present disclosure is not limited to this. As shown in FIG. 31, a plurality of groove portions 244 may be formed on both surfaces of the first lateral fin 241. At this time, it is desirable that the plurality of groove portions 244 on both sides of the first lateral fin 241 are formed at different positions to be shifted in the left-right direction DRw. This can restrict the decrease in strength of the first lateral fin 241.

Further, the first lateral fin 241 may be provided with a plurality of groove portions 244 arranged side by side in the left-right direction DRw at different intervals. Further, the shape of the plurality of groove portions 244 is not limited to a quadrangular shape, and may be, for example, an arc, a triangular shape, or the like. The same may be applied to the second lateral fin 242.

Tenth Embodiment

Next, a tenth embodiment will be described with reference to FIGS. 32 and 33. The present embodiment is different from the sixth embodiment in that auxiliary flow passages 247 are provided in the lateral fin 24. In the present embodiment, a difference part different from the sixth embodiment will be mainly described, and description for a part similar to the sixth embodiment will be omitted.

Figure 32:
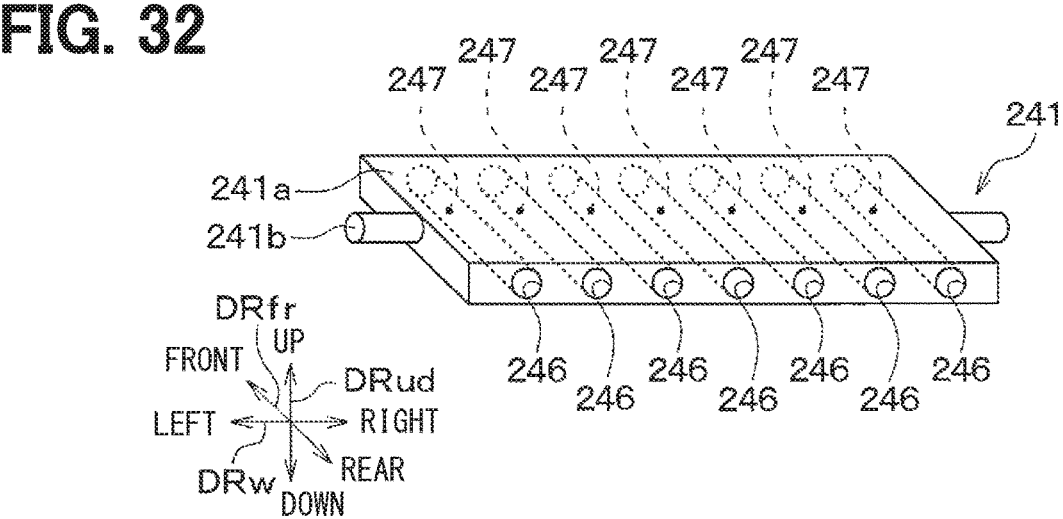
FIG. 32 is a schematic perspective view showing a first lateral fin used in a fluid discharge device according to a tenth embodiment.
Figure 33:
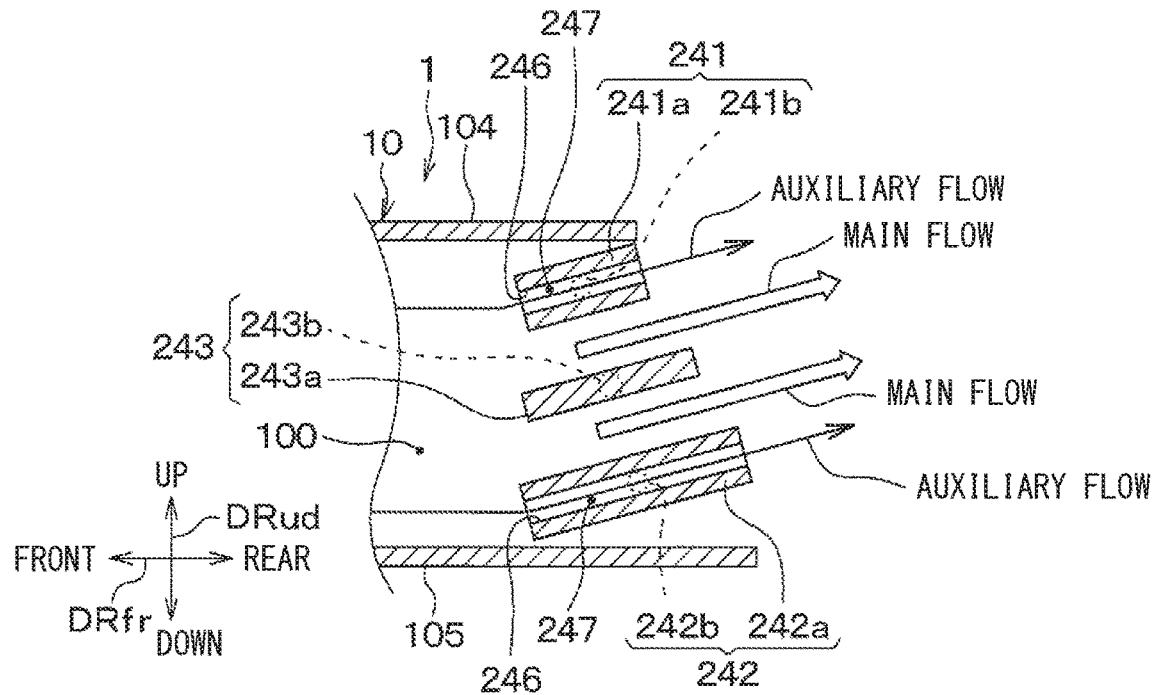
FIG. 33 is a diagram for explaining a relationship between a main flow and an auxiliary flow blown from a grill portion of the fluid discharge device according to the tenth embodiment.

As shown in FIGS. 32 and 33, the first lateral fin 241 is provided with a plurality of through holes 246 extending along the plate surface. Specifically, in the first lateral fin 241, a plurality of through holes 246 are provided to be arranged side by side in the left-right direction DRw at regular intervals. The plurality of through holes 246 define an auxiliary flow passage 247 that guides a part of the air flowing through the flow passage 100 to the opening 101, as the auxiliary flow. That is, the auxiliary flow passage 247 is formed between the inner wall surface of the duct 10 and the first lateral fin 241 by the plurality of through holes 246 formed in the first lateral fin 241. The cross section of the plurality of through holes 246 of the present embodiment is not limited to a round shape, but may be a quadrangular shape or a triangular shape.

Further, although not shown, the second lateral fin 242 is also formed with a plurality of through holes 246 extending along the plate surface. Specifically, in the second lateral fin 242, a plurality of through holes 246 are provided to be arranged side by side in the left-right direction DRw at regular intervals. That is, the auxiliary flow passage 247 is formed between the inner wall surface of the duct 10 and the second lateral fin 242 by the plurality of through holes 246 formed in the second lateral fin 242.

The other configurations are the same as those of the sixth embodiment. The fluid discharge device 1 of the present embodiment has a structure in which the auxiliary flow discharged from the auxiliary flow passage 250 flows together and in parallel with the main flow discharged from the outside area of the flow passage 100. Therefore, the action and effect described in the sixth embodiment can be obtained in the same manner as in the sixth embodiment.

If the auxiliary flow passage 247 is made of a plurality of through holes 246 formed in the first lateral fin 241 and the second lateral fin 242 as in the present embodiment, the auxiliary stream can be more stably supplied as compared with the case where the auxiliary flow passage 247 is formed by the groove portion 244. In this case, it is not necessary to add a member for forming the auxiliary flow passage 247. Therefore, the grill portion 20 can be simplified.

Modification of the Tenth Embodiment

Figure 34:
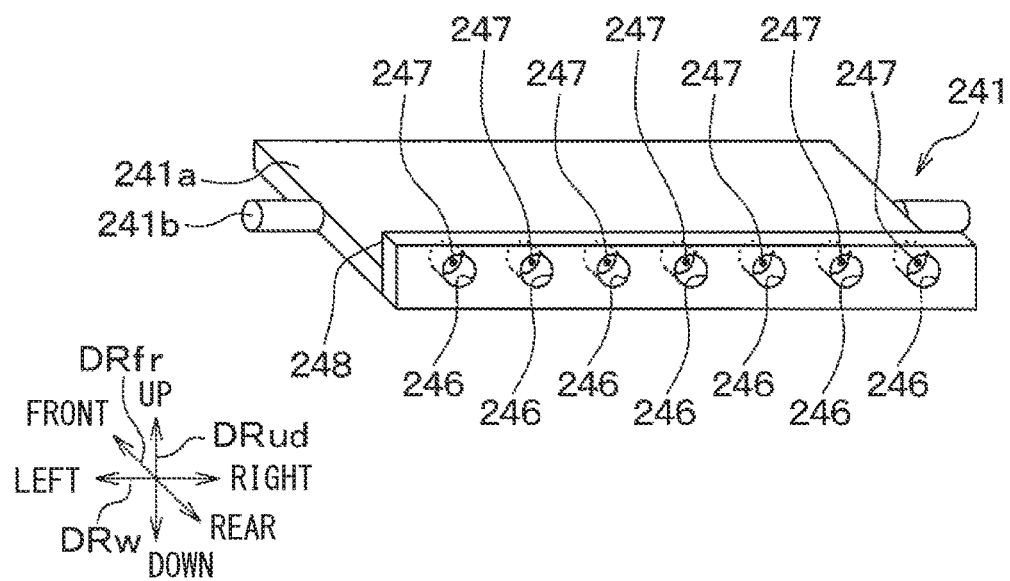
FIG. 34 is a schematic perspective view showing a modification of a first lateral fin used in the fluid discharge device according to the tenth embodiment.

In the tenth embodiment described above, a plurality of through holes 246 are formed in the plate portion 241a of the first lateral fin 241 and the plate portion 242a of the second lateral fin 242, but the present disclosure is not limited to this. For example, as shown in FIG. 34, a cross wall portion 241c may be provided at the end of the plate portion 241a of the first lateral fin 241 on a side of the opening 101, and a plurality of through holes 246 may be provided in the cross wall portion 241c. In this case, the auxiliary flow passage 247 is formed by the plurality of through holes 246. The same may be applied to the second lateral fin 242. The cross wall portion 241c extends in a direction intersecting the plate surface of the plate portion 241a at the end of the plate portion 241a on the side of the opening 101.

Further, the first lateral fin 241 may be provided with a plurality of through holes 246 arranged side by side in the left-right direction DRw at different intervals. Further, the shape of the plurality of through holes 246 is not limited to a circular shape, and may be, for example, a triangular shape, a quadrangular shape, an elongated hole shape, or the like. The same may be applied to the second lateral fin 242.

Eleventh Embodiment

Figure 35:
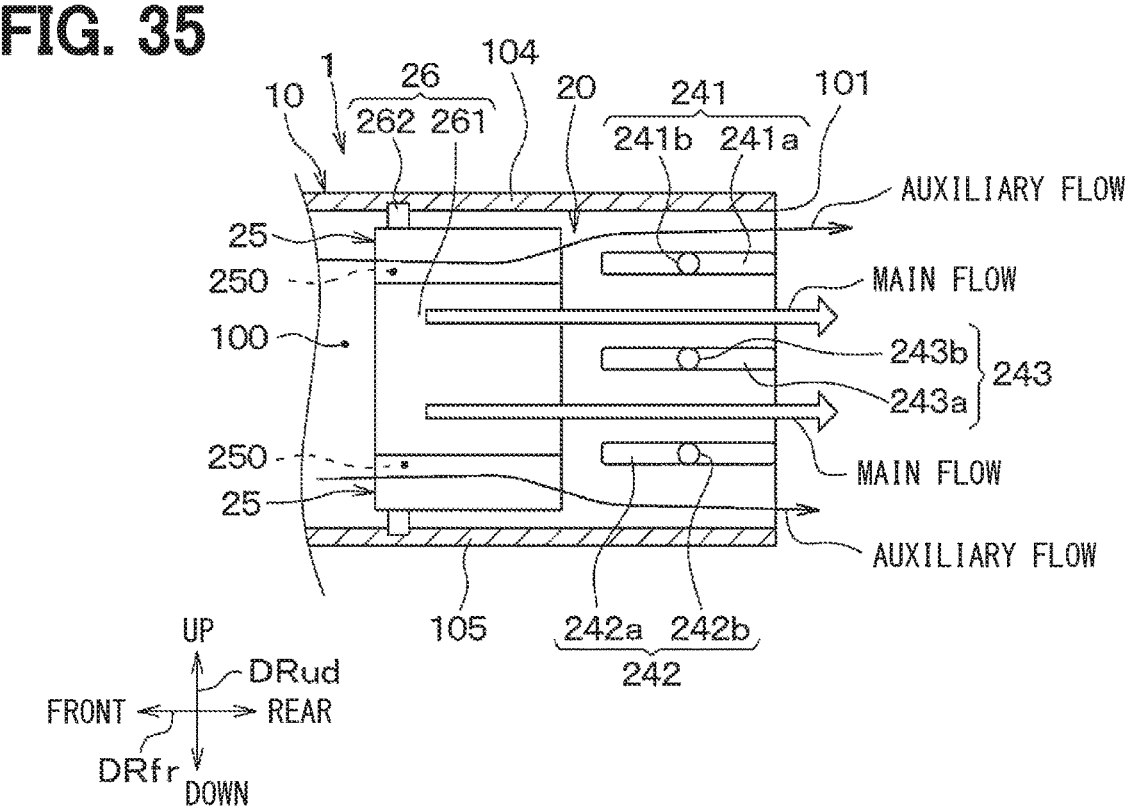
FIG. 35 is a schematic perspective view of a fluid discharge device according to an eleventh embodiment.

Next, an eleventh embodiment will be described with reference to FIG. 35. The present embodiment is different from the sixth embodiment, in which auxiliary flow passages 250 are provided in the vertical fin 26. In the present embodiment, a difference part different from the sixth embodiment will be mainly described, and description for a part similar to the sixth embodiment will be omitted.

The sub-frame body 25 is provided not at the lateral fin 24 but at the vertical fin 26. That is, as shown in FIG. 35, the sub-frame body 25 is provided with respect to the vertical fin 26, so that the direction of the auxiliary flow blown out from the auxiliary flow passage 250 is aligned with the direction of the main flow blown out from the flow passage 100. The sub-frame body 25 is formed in a tubular shape, and the auxiliary flow passage 250 is formed by the inner wall surface of the sub-frame body 25. More specifically, the sub-frame bodies 25 are provided at two end sides in the longitudinal direction of the plate portion 261 constituting the vertical fin 26.

When the air conditioning unit ACU operates, the conditioned air with a temperature or humidity adjusted by the air conditioning unit ACU, flows into the fluid discharge device 1 through an air conditioning duct. The conditioned air flowing into the fluid discharge device 1 flows through the flow passage 100 of the duct 10, and a part thereof flows into the auxiliary flow passage 250. Then, the conditioned air flowing through the flow passage 100 and the auxiliary flow passage 250 is blown into the vehicle interior. At this time, the auxiliary flow discharged from the auxiliary flow passage 250 flows in parallel with the main flow, so that a development of the lateral vortex formed around the main flow is suppressed.

The fluid discharge device 1 described above has a structure in which the auxiliary flow discharged from the auxiliary flow passage 250 flows together and in parallel with the main flow discharged from the outside area of the flow passage 100. Because of the above structure, the development of the lateral vortex formed in the main flow can be reduced by the auxiliary flow. Thus, it is possible to suppress a diffusion of the main stream and a drawing of the external fluid drawn from outside of the device into the main stream. As a result, the reaching distance of the main flow can be increased.

Modification of the Eleventh Embodiment

Figure 36:
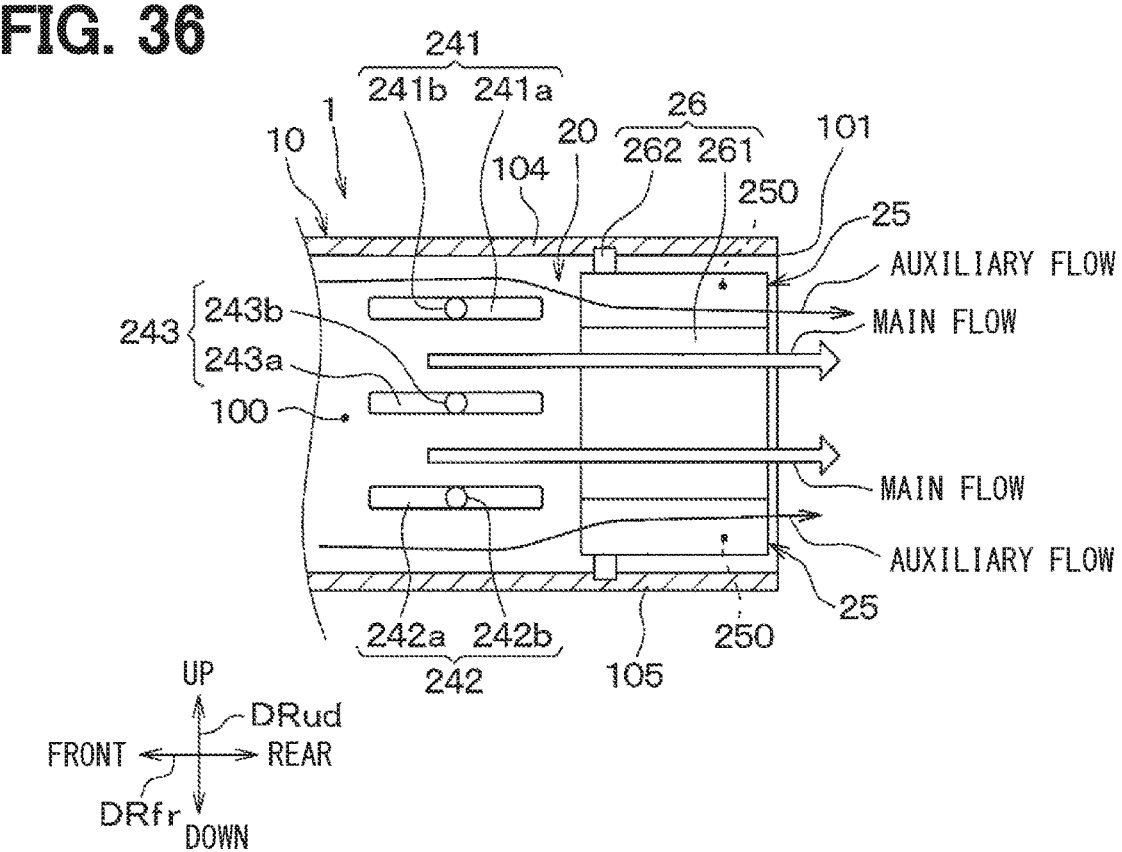
FIG. 36 is a schematic sectional view showing a modification of the fluid discharge device according to a modification of the eleventh embodiment.

In the eleventh embodiment described above, the vertical fin 26 is arranged at a position on the upstream side of the lateral fin 24 inside the duct 10, but the present disclosure is not limited to this. In the grill portion 20, for example, as shown in FIG. 36, the vertical fin 26 may be arranged at a position close to the opening 101 inside the duct 10. In this case, the lateral fins 24 are arranged at a position of the inside of the duct 10 on an upstream side of the vertical fin 26. As a result, the auxiliary flow discharged from the auxiliary flow passage 250 can easily flow in parallel with and adjacent to the main flow flowing in the outside area of the flow passage 100. Therefore, the action and effect described in the eleventh embodiment can be obtained in the same manner as in the eleventh embodiment.

In the eleventh embodiment described above, an example where the sub-frame body 25 is formed in a tubular shape is illustrated, but the present disclosure is not limited to this. The sub-frame body 25 may be formed in a shape other than the tubular shape. Further, the auxiliary flow passage 250 may be formed by a groove or a through hole provided in the vertical fin 26.

Other Embodiments

The representative embodiments of the present disclosure have been described above. However, the present disclosure is not limited to the above-described embodiments, and may be variously modified as follows.

In the first to fifth embodiments described above, a configuration in which the sub-frame body 23 is provided for each of the first outside portion 220a and the second outside portion 220b of the adjustment fin 22 is illustrated, but the present disclosure is not limited to this. The sub-frame body 23 may be provided on the first outside portion 220a of one adjustment fin 22, and may be provided on the second outside portion 220b of the other adjustment fin 22, for example, in the adjacent adjustment fins 22.

In the first to fifth embodiments described above, the sub-frame body 23 is provided at the adjustment fin 22 so that a part of the main flow passage 210 and the auxiliary flow passage 230 overlap each other in the circumferential direction of the main frame body 21. However, the present disclosure is not limited to this. The sub-frame body 23 may be provided at the adjustment fin 22 to face the inner wall surface of the main frame body 21 so that the auxiliary flow passage 230 is formed at the outside of the main flow passage 210.

In the first to fifth embodiments described above, as the main frame body 21, the upper frame 213 and the lower frame 214 have a dimension longer than that of the left frame 211 and the right frame 212, but the present disclosure is limited thereto. The main frame body 21 may be configured such that the dimension of the upper frame 213 and the lower frame 214 is the same or shorter than the dimension of the left frame 211 and the right frame 212. Further, the main frame body 21 is not limited to a substantially square tubular member but may be made of a substantially cylindrical tubular member as long as it can be accommodated inside the duct 10.

In the first to fifth embodiments described above, the end portions of the adjustment fins 22 in the longitudinal direction are rotatably supported in the upper frame 213 and the lower frame 214 of the main frame body 21 so that the direction of the air flow can be adjusted in the left-right direction DRw. However, but the present disclosure is not limited to this. The adjustment fin 22 may be rotatably supported with respect to the left frame portion 211 and the right frame portion 212 of the main frame body 21, for example, so that the direction of the air flow can be adjusted in the up-down direction DRud. In this case, the direction of the discharged airflow can be adjusted in the up-down direction DRud by rotatably supporting the left frame 211 and the right frame 212 of the main frame body 21 with respect to the duct 10.

Further, in the above-described first embodiment, a plurality of adjustment fins 22 are rotatably supported with respect to the main frame body 21, but the present disclosure is not limited to this. The plurality of adjustment fins 22 may be rotatably supported, for example, with respect to a support shaft that crosses the inside of the main frame body 21 in the left-right direction DRw.

In the above-described embodiment, the air-conditioning unit ACU has been exemplified as an air conditioner for adjusting the temperature or humidity of the air introduced into the duct 10, but the present disclosure is not limited thereto. The air conditioner may be made of, for example, a humidifier that humidifies the entire or part of the vehicle interior or a dehumidifier that dehumidifies the entire or part of the vehicle interior.

In the above-described embodiment, an example in which the fluid discharge device 1 of the present disclosure is applied to an air discharge device of an air conditioning unit for performing an air conditioning of a vehicle compartment is illustrated, but the present disclosure is not limited to this. The fluid discharge device 1 of the present disclosure can be applied to an air outlet device other than the air discharge device of the air conditioning unit ACU. Further, the fluid blowing device 1 of the present disclosure is also applicable to a device that blows a gas or liquid other than air.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, it is not limited to the shape, positional relationship, and the like, except for the case where it is specifically specified, the case where it is fundamentally limited to a specific shape, positional relationship, and the like, and the like.

Overview

A fluid discharge device shown in part or all of the above embodiments includes a duct defining a fluid flow passage and provided with an opening at a downstream end of the fluid flow passage, and a grill portion disposed in the fluid flow passage to adjust a flow direction of the fluid discharged from the opening. The grill portion includes at least an adjustment fin rotatably arranged in the fluid flow passage, and is provided with an auxiliary flow passage that guides a part of the fluid flowing through the fluid flow passage to the opening as an auxiliary flow. The auxiliary flow passage is configured with the adjustment fin to adjust a flow direction of the auxiliary flow discharged from the auxiliary flow passage to be aligned with the flow direction of the fluid flowing through the fluid flow passage.

According to a second aspect, the auxiliary flow passage is provided at least between the adjustment fin and an inner wall surface of the duct. Thus, the auxiliary flow flows substantially in parallel with a main flow flowing along the inner wall surface of the duct. Therefore, development of a lateral vortex formed in the main flow can be reduced by the auxiliary flow. For example, when a main frame body defining a main flow passage is arranged inside the duct, the auxiliary flow of the fluid flows in parallel with the main flow of the fluid flowing along an inner wall surface of the main frame body.

According to a third aspect, the grill portion includes a tubular main frame body defining a main flow passage that guides a part of the fluid flowing through the fluid flow passage to the opening as a main flow, and at least a sub-frame body defining an auxiliary flow passage. The adjustment fin is arranged inside the main frame body and is rotatably supported with respect to the main frame body. The sub-frame body is provided at an outside position of the adjustment fin so that a flow direction of the auxiliary flow discharged from the auxiliary flow passage is aligned with a flow direction of the main flow discharged from the main flow passage.

According to a fourth aspect, the sub-frame body of the fluid discharge device is provided respectively at a first outside portion positioned at one end side of a longitudinal direction of the adjustment fin, and at a second outside portion positioned at the other end side of the longitudinal direction of the adjustment fin. In this case, the sub-frame bodies defining the auxiliary flow passage are provided at the two end sides of the adjustment fin in the longitudinal direction of the adjustment fin. Thus, development of the lateral vortex formed in the main flow near two end sides of the adjustment fin can be effectively suppressed.

In a fluid discharge device according to a fifth aspect, the sub-frame body is provided at the adjustment fin so that a part of the main flow passage and the auxiliary flow passage overlap each other in a circumferential direction of the main frame body. According to this, the auxiliary flow discharged from the auxiliary flow passage is easy to flow together and in parallel with the main flow flowing in the outside area of the main flow passage among the main flow discharged from the main flow passage. Therefore, the development of the lateral vortex formed near the outside area in the main flow can be further suppressed.

According to a sixth aspect, the sub-frame body of the fluid discharge device is configured such that a cross-sectional area of the auxiliary flow passage at an upstream side is larger than that at a downstream side in the auxiliary flow passage.

In the fluid flow passage inside the duct, the flow velocity of the fluid near the wall surface tends to be smaller than that at a position away from the wall surface due to wall surface loss. If the sub-frame bodies are simply provided in the outside portions of the adjustment fin closer to the wall surface defining the fluid flow passage, the flow rate of the fluid flowing through the auxiliary flow passage may be insufficient.

On the other hand, if the cross-sectional area of the auxiliary flow passage is larger in the upstream side area than that in the downstream side area, the fluid can easily flow from the fluid flow passage into the auxiliary flow passage. Therefore, it is possible to sufficiently secure the flow rate of the fluid flowing through the auxiliary flow passage.

According to a seventh aspect of the fluid discharge device, the main frame body includes a pair of vertical frames extending along the longitudinal direction of the adjustment fin, and a pair of lateral frames located at two ends of the adjustment fin in the longitudinal direction of the adjustment fin and connected to the pair of vertical frames. In the main frame body, the pair of vertical frames are rotatably supported with respect to the duct.

According to an eighth aspect of the fluid discharge device, the grill portion includes at least one sub-frame body defining the auxiliary flow passage. The sub-frame body is provided with respect to the adjustment fin so that a flow direction of the auxiliary flow discharged from the auxiliary flow passage is aligned with a flow direction of the main flow discharged from the fluid flow passage. According to this, because the auxiliary flow passage is formed by the sub-frame body provided in the adjustment fin, the main flow and the auxiliary flow of the fluid flowing in the fluid flow passage can run together in parallel with each other.

Accordingly, the flow direction of the fluid can be adjusted by rotating the main frame body with respect to the duct, in addition to the adjustment of the flow direction of the fluid due to the rotation of the adjustment fin. Therefore, the degree of freedom when adjusting the direction of the fluid blown from the opening can be improved.

According to a ninth aspect, the adjustment fin of the fluid discharge device has a plate portion extending along the longitudinal direction of the adjustment fin. Further, the sub-frame body is provided at an end of the plate portion of the adjustment fin in the longitudinal direction. According to this, the auxiliary flow discharged from the auxiliary flow passage is easy to flow together and in parallel with the main flow flowing in the outside area of the main flow passage among the main flow discharged from the main flow passage. Thus, development of the lateral vortex formed in the main flow near the outsides of the adjustment fin can be effectively suppressed.

According to a tenth aspect, the adjustment fin of the fluid discharge device has a plate portion extending along the longitudinal direction of the adjustment fin. Further, the sub-frame body is provided at two surfaces of the plate portion of the adjustment fin. According to this, the auxiliary flow discharged from the auxiliary flow passage is easy to flow together and in parallel with the main flow flowing in the outside area of the main flow passage among the main flow discharged from the main flow passage. Therefore, the development of the lateral vortex formed near the outside area in the main flow can be further suppressed.

According to an eleventh aspect, the sub-frame body of the fluid discharge device is formed in a tubular shape. The auxiliary flow passage is formed by an inner wall portion of the sub-frame body. In this way, because the auxiliary flow passage is formed by the inner wall portion of the sub-frame body, the auxiliary flow passage can be easily added to the fluid discharge device having the main flow passage.

According to a twelfth aspect of the fluid discharge device, the sub-frame body has a shape that covers facing wall portions including a portion of the main frame body, facing the end of the adjustment fin in the longitudinal direction of the adjustment fin. In this case, the auxiliary flow passage is formed by an inner wall portion of the sub-frame body and the facing wall portion. Because the auxiliary flow passage is formed by the inner wall portion of the sub-frame body and the facing wall portion of the main frame body, the auxiliary flow passage can be easily added to the fluid discharge device having the main flow passage.

According to a thirteenth aspect, the auxiliary flow passage is formed by at least one groove provided on the surface of the adjustment fin. In this case, it is not necessary to add a member for forming the auxiliary flow passage. Therefore, the grill portion can be simplified.

According to a fourteenth aspect, the auxiliary flow passage is formed by a through hole provided in the adjustment fin. In this case, it is not necessary to add a member for forming the auxiliary flow passage. Therefore, the grill portion can be simplified.

According to a fifteenth aspect, the duct of the fluid discharge device is connected to an air conditioner configured to adjust a temperature or humidity of air at an upstream side of the air flow so that conditioned air as the fluid having an adjusted temperature or humidity flows into the fluid flow passage.

As described above, in the fluid discharge device of the present embodiment, suction action of an external fluid drawn from outside of the device into the main flow can be reduced by the auxiliary flow. Therefore, if the fluid discharge device of the present disclosure is used as an air discharge device of an air conditioner, it can restrict the temperature or humidity of the conditioned air adjusted by the air conditioner from being changed by an outside air outside the device, which are not adjusted in the temperature or humidity. In other words, according to the fluid discharge device of the present disclosure, it becomes easier for the air having a temperature or humidity adjusted by the air conditioner to reach a desired space while maintaining the adjusted temperature or humidity.

What is claimed is:

1. A fluid discharge device for discharging a fluid, comprising:

a duct defining a fluid flow passage and having an opening at a downstream end of the fluid flow passage; and a grill portion disposed in the fluid flow passage to adjust a flow direction of the fluid blown from the opening, wherein the grill portion includes a plurality of adjustment fins rotatably arranged on individual axes such that each fin of the plurality of fins rotates on a different axis in the fluid flow passage, and is provided with a plurality of sub-frame bodies defining a plurality of corresponding auxiliary flow passages that guide a part of the fluid flowing through the fluid flow passage to the opening, as an auxiliary flow, wherein each sub-frame body is directly attached to an end portion of a corresponding adjustment fin that is closer to the duct than a central portion in a longitudinal direction of the corresponding adjustment fin, the auxiliary flow passages are configured with the adjustment fins to cause a flow direction of the auxiliary flow discharged from the auxiliary flow passages to be aligned with the flow direction of the fluid flowing through the fluid flow passage, and the auxiliary flow passages overlap each other in a circumferential direction of the main frame body.

2. The fluid discharge device according to claim 1, wherein the auxiliary flow passages are provided at least between the adjustment ns and an inner wall surface of the duct.

3. The fluid discharge device according to claim 1, wherein when a portion located at one end side of the adjustment fins in the longitudinal direction is defined as a first outside portion, and a portion located on the other end side of the adjustment fins in the longitudinal direction is defined as a second outside portion, the sub-frame bodies are provided in each of the first outside portion and the second outside portion of the adjustment fins.

4. The fluid discharge device according to claim 1, wherein the sub-frame bodies are configured such that a passage cross-sectional area of the auxiliary flow passages becomes larger at an upstream area of the auxiliary flow passages as compared with a downstream area of the auxiliary flow passages.

5. The fluid discharge device according to claim 1, wherein the sub-frame bodies are provided at the adjustment fins such that a direction of the auxiliary flow discharged from the auxiliary flow passages is aligned with a direction of the main flow discharged from the fluid flow passage.

6. The fluid discharge device according to claim 1, wherein the adjustment fins include a plate portion extending along the longitudinal direction, and the sub-frame bodies are provided at an end portion of the plate portion in the longitudinal direction.

7. The fluid discharge device according to claim 1, wherein the adjustment fins include a plate portion extending along the longitudinal direction, and the sub-frame bodies are provided at two sides of a plate surface of the plate portion.

8. The fluid discharge device according to claim 1, wherein the sub-frame bodies are formed in a tubular shape, and the auxiliary flow passages are defined by an inner wall portion of the sub-frame bodies.

9. The fluid discharge device according to claim 1, wherein
the sub-frame bodies are configured to cover a facing wall portion that is a portion of the main frame body, facing an end of the adjustment fins in the longitudinal direction of the adjustment fins, and
the auxiliary flow passages are defined by an inner wall portion of the sub-frame bodies and the facing wall portion.

10. The fluid discharge device according to claim 1, wherein
the auxiliary flow passages are defined by at least a through hole provided in the adjustment fins to penetrate through the adjustment fins.

11. The fluid discharge device according to claim 1, wherein
the duct is connected to an air conditioner configured to adjust a temperature or a humidity of air as the fluid at an upstream air side so that conditioned air having an adjusted temperature or humidity flows to the fluid flow passage.

12. The fluid discharge device according to claim 1, wherein the plurality of adjustment fins are arranged in parallel with each other.

13. A fluid discharge device for discharging a fluid, comprising:
a duct defining a fluid flow passage and having an opening at a downstream end of the fluid flow passage; and
a grill portion disposed in the fluid flow passage to adjust a flow direction of the fluid blown from the opening, wherein
the grill portion includes a plurality of adjustment fins rotatably arranged on individual axes such that each fin of the plurality of fins rotates on a different axis in the fluid flow passage, and is provided with a plurality of sub-frame bodies defining a plurality of corresponding auxiliary flow passages that guide a part of the fluid flowing through the fluid flow passage to the opening, as an auxiliary flow, wherein each sub-frame body is directly attached to an end portion of a corresponding adjustment fin that is closer to the duct than a central portion in a longitudinal direction of the corresponding adjustment fin, and
the auxiliary flow passages are provided at the adjustment fins within the duct and extend in a direction parallel to the flow direction of the fluid flowing through the fluid flow passage, and
the auxiliary flow passages overlap each other in a circumferential direction of the main frame body.

14. The fluid discharge device according to claim 13, wherein
the auxiliary flow passages are provided at two end sides of the adjustment fins in a longitudinal direction of the adjustment fins.

15. The fluid discharge device according to claim 13, wherein
the auxiliary flow passages are configured by a through hole penetrating through the adjustment fins.

16. The fluid discharge device according to claim 13, wherein the plurality of adjustment fins are arranged in parallel with each other.

* * * * *